(12) United States Patent
Ganly

(10) Patent No.: US 10,842,216 B2
(45) Date of Patent: Nov. 24, 2020

(54) PROTECTIVE HEADGEAR

(71) Applicant: CONTEGO SPORTS LIMITED, Oranmore (IE)

(72) Inventor: Mark Ganly, Kinvara (IE)

(73) Assignee: Contego Sports Limited, Oranmore (IE)

( * ) Notice: Subject to any disclaimer, the term of this patent is extended or adjusted under 35 U.S.C. 154(b) by 71 days.

(21) Appl. No.: 16/078,936

(22) PCT Filed: Feb. 23, 2017

(86) PCT No.: PCT/EP2017/054211
§ 371 (c)(1),
(2) Date: Aug. 22, 2018

(87) PCT Pub. No.: WO2017/144600
PCT Pub. Date: Aug. 31, 2017

(65) Prior Publication Data
US 2019/0053563 A1   Feb. 21, 2019

(30) Foreign Application Priority Data

Feb. 25, 2016   (EP) .................................... 16157331
Oct. 17, 2016   (EP) .................................... 16194145

(51) Int. Cl.
*A42B 3/06*   (2006.01)
*A42B 3/12*   (2006.01)
(Continued)

(52) U.S. Cl.
CPC ................ *A42B 3/069* (2013.01); *A42B 3/00* (2013.01); *A42B 3/08* (2013.01); *A42B 3/127* (2013.01);
(Continued)

(58) Field of Classification Search
CPC .. A42B 3/069; A42B 3/00; A42B 3/08; A42B 3/127; A42B 3/128; A42B 3/125
(Continued)

(56) References Cited

U.S. PATENT DOCUMENTS 1,080,690 A * 12/1913 Hipkiss ..................... A42B 3/00
   2/412
1,483,881 A *  2/1924 Hart .......................... A42B 3/00
   2/412
(Continued)

FOREIGN PATENT DOCUMENTS

DE   27 46 897 A1   4/1979
KR   10-1397675 B1   5/2014
(Continued)

OTHER PUBLICATIONS

International Search Report issued in PCT/EP2017/054211; dated May 2, 2017.
(Continued)

*Primary Examiner* — Alissa L Hoey
(74) *Attorney, Agent, or Firm* — Studebaker & Brackett PC

(57) ABSTRACT

Protective headgear in one case comprises a main body having a pair of side head parts connected by a forehead part and a crown part extending from the forehead part. The body is shaped to encompass the head of a wearer. The main body comprises an inner sheet of an open cell polyurethane foam material, an outer barrier layer, and an intermediate section comprising portions of an open cell polyurethane foam material between the inner and the outer layers. The open cell polyurethane foam has a density of from 100 to 300 kg/m³ which significantly reduces the G-force energy transferred to a players head during impact.

17 Claims, 29 Drawing Sheets

(51) Int. Cl.
 *A42B 3/00*  (2006.01)
 *B32B 3/08*  (2006.01)
 *A42B 3/08*  (2006.01)

(52) U.S. Cl.
 CPC ....... *B32B 3/085* (2013.01); *B32B 2266/0278* (2013.01); *B32B 2266/06* (2013.01)

(58) Field of Classification Search
 USPC .................................................... 2/411, 6.1
 See application file for complete search history.

(56) References Cited

U.S. PATENT DOCUMENTS

| | | | |
|---|---|---|---|
| 5,544,367 A * | 8/1996 | March, II | A42B 3/00 2/410 |
| 5,661,854 A * | 9/1997 | March, II | A42B 3/00 2/410 |
| 5,930,841 A | 8/1999 | Lampe et al. | |
| 6,247,181 B1 * | 6/2001 | Hirsch | A42B 1/041 2/171 |
| 6,349,416 B1 * | 2/2002 | Lampe | A42B 3/00 2/411 |
| 6,360,376 B1 * | 3/2002 | Carrington | A42B 3/00 2/411 |
| 6,625,820 B1 * | 9/2003 | Lampe | A42B 3/00 2/171 |
| 10,512,295 B1 * | 12/2019 | Hanson | A42B 3/08 |
| 2001/0011388 A1 | 8/2001 | Nelson et al. | |
| 2002/0056521 A1 | 5/2002 | Chen et al. | |
| 2007/0000032 A1 * | 1/2007 | Morgan | A42B 3/124 2/412 |
| 2012/0192337 A1 | 8/2012 | Divine et al. | |
| 2013/0000017 A1 | 1/2013 | Szalkowski et al. | |
| 2013/0042748 A1 * | 2/2013 | Leung | F41H 1/04 89/36.02 |
| 2013/0174329 A1 * | 7/2013 | Hanson | A42B 3/069 2/411 |
| 2013/0232670 A1 * | 9/2013 | Janetos | A42B 3/125 2/414 |
| 2014/0075652 A1 * | 3/2014 | Hanson | A42B 3/127 2/411 |
| 2014/0237703 A1 * | 8/2014 | Tateo | A42B 1/08 2/181 |
| 2014/0298571 A1 | 10/2014 | Dagan | |
| 2014/0331391 A1 | 11/2014 | Storelli et al. | |
| 2015/0040296 A1 * | 2/2015 | Hanson | A42B 3/127 2/411 |
| 2015/0305430 A1 * | 10/2015 | Rush | A42B 3/124 2/412 |
| 2016/0302500 A1 * | 10/2016 | Johnston | A41D 20/00 |
| 2017/0303612 A1 * | 10/2017 | Morgan | A41D 31/285 |
| 2018/0199653 A1 * | 7/2018 | Paige, Sr. | A42B 3/125 |

FOREIGN PATENT DOCUMENTS

| | | |
|---|---|---|
| WO | 99/29199 A1 | 6/1999 |
| WO | 2005/000057 A2 | 1/2005 |

OTHER PUBLICATIONS

Written Opinion issued in PCT/EP2017/054211; dated May 2, 2017.
United Kingdom Search Report issued by the Intellectual Property Office dated Jun. 23, 2017, which corresponds to British Application No. 1702890.3.
Seamus Cook; "Medical Study Finds Scrum-Caps Fail to Prevent Head Injuries"; Irish Examiner; Dec. 20, 2011; http://www.irishexaminer.com/sport/rugby/medical-study-finds-scrum-caps-fail-to-prevent-head-injuries-177733.html.
Halstead, M. et al. and The Council on Sports Medicine and Fitness. Clinical Report—"Sport-Related Concussion in Children and Adolescents"—American Academy of Pediatrics, vol. 126, No. 3, Sep. 2010, p. 597-598.
England Professional Rugby Injury Surveillance Project, 2015-2016 Season Report; http://www.englandrugby.com/mm/Document/General/General/01/32/25/17/1516_PRISP_Annual_Report_FINAL(withcontentspage)_English.pdf.
World Rugby Regulation 12 (last updated Jan. 3, 2017).
Irish Examiner, Dec. 2011; http://www.irishexaminer.com/sport/rugby/medical-study-finds-scrum-caps-fail-to-prevent-head-injuries-177733.html.
Viano, D. et al.; "Concussion in professional football: Animal model of brain injury"—Part 15, Neurosurgery, 2009, 64, 1162-1173.
Mychasiuk, R. et al.; "The direction of the acceleration and rotational forces associates with mild traumatic brain injury in rodents effect behavioural and molecular outcomes"; Journal of Neuroscience Methods. 257, 168-178.
Divirgilio, T. et al.; "Evident for Acute Electrophysiological and Cognitive Changes Following Routine Soccer Heading"; EBioMedicine 13 (2016) 66-71. http://www.ebiomedicine.com/article/S2352-3964(16)30490-X/abstract.
Takahata, K. et al.; "Late-onset Neurodegenerative Diseases Following Traumatic Brain Injury: Chromic Traumatic Encephalopathy (CTE) and Alzheimer's Disease Secondary to TBI (AD-TBI)"; Brain Nerve, Jul. 2016; 68(7): 849-57 abstract. https://www.ncbi.nlm.nih.gov/pubmed/27395469.
Hutchison, et al. "Head Trauma in Mixed Martial Arts";The American Journal of Sports Medicine (2014), vol. 42, No. 6, 1352-1358. https://www.ncbi.nlm.nih.gov/pubmed/24658345.

* cited by examiner

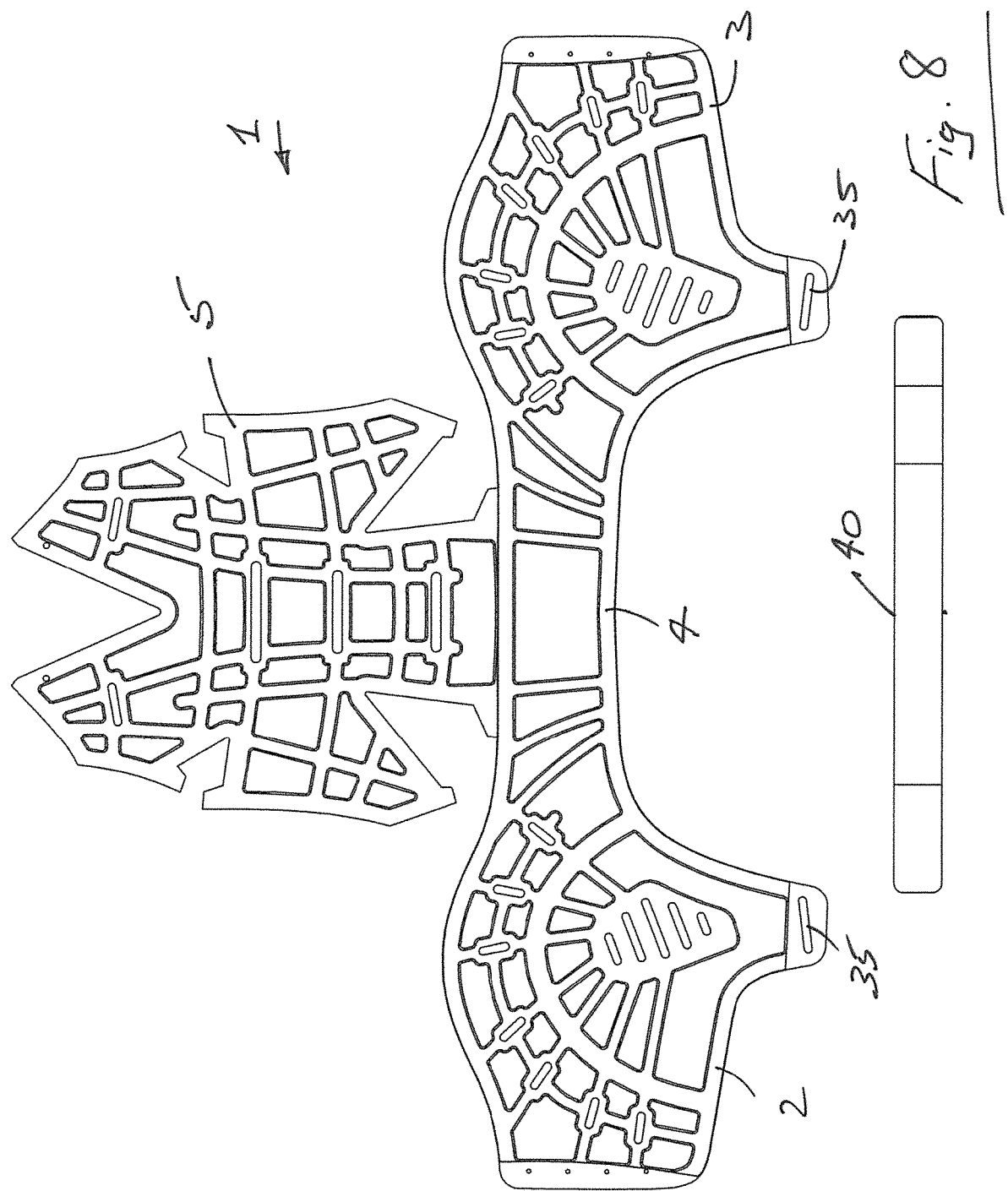

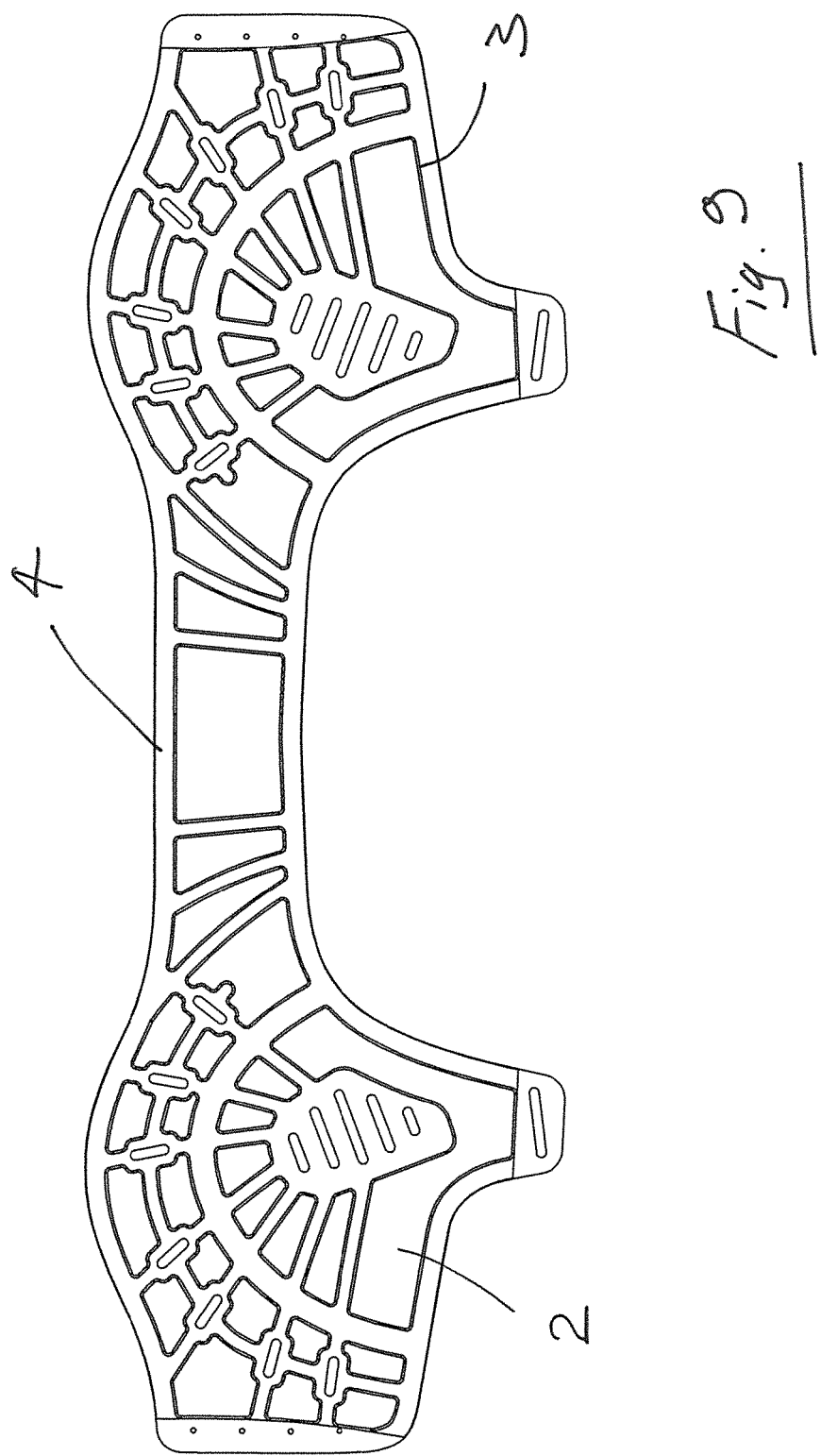

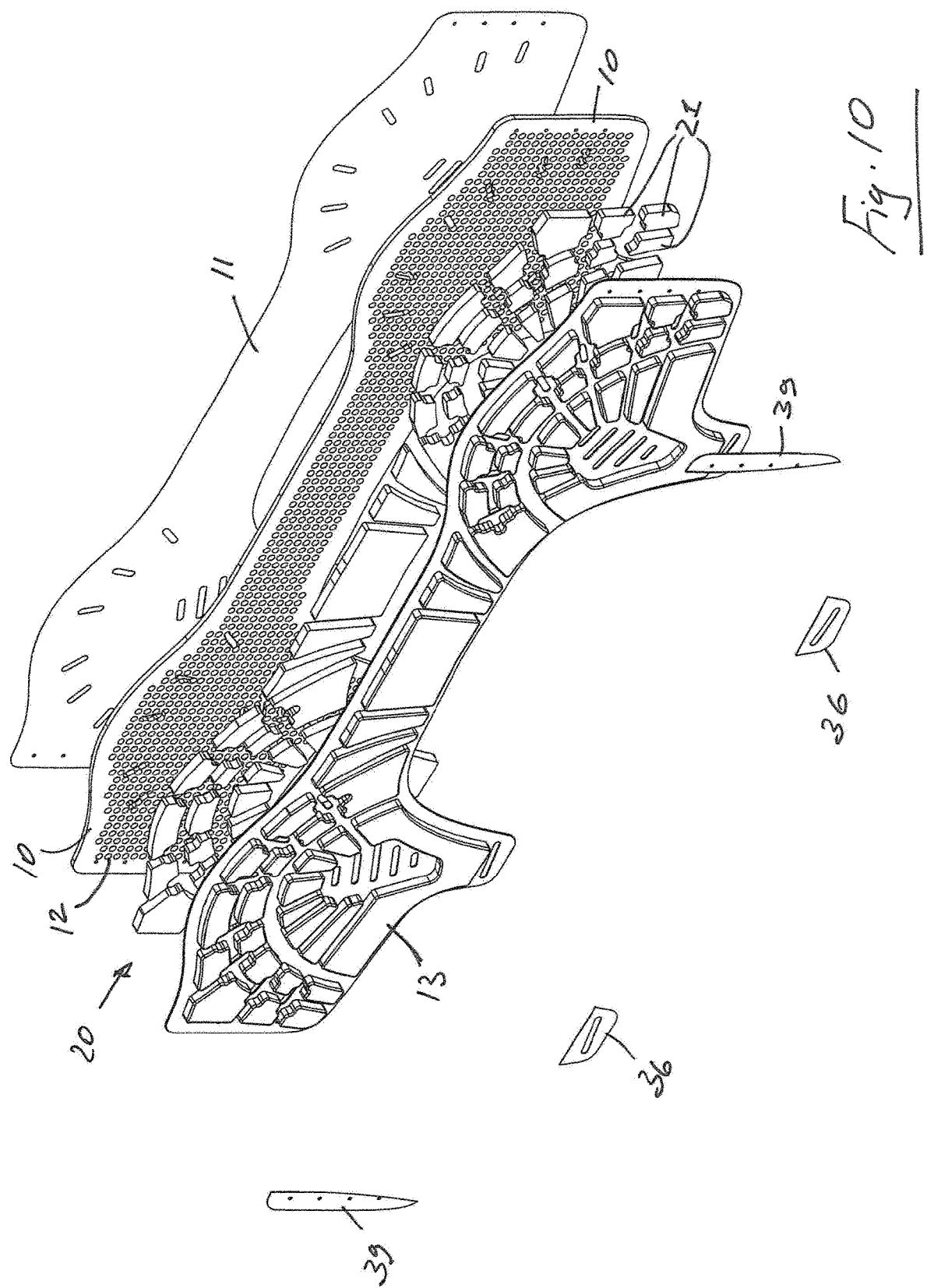

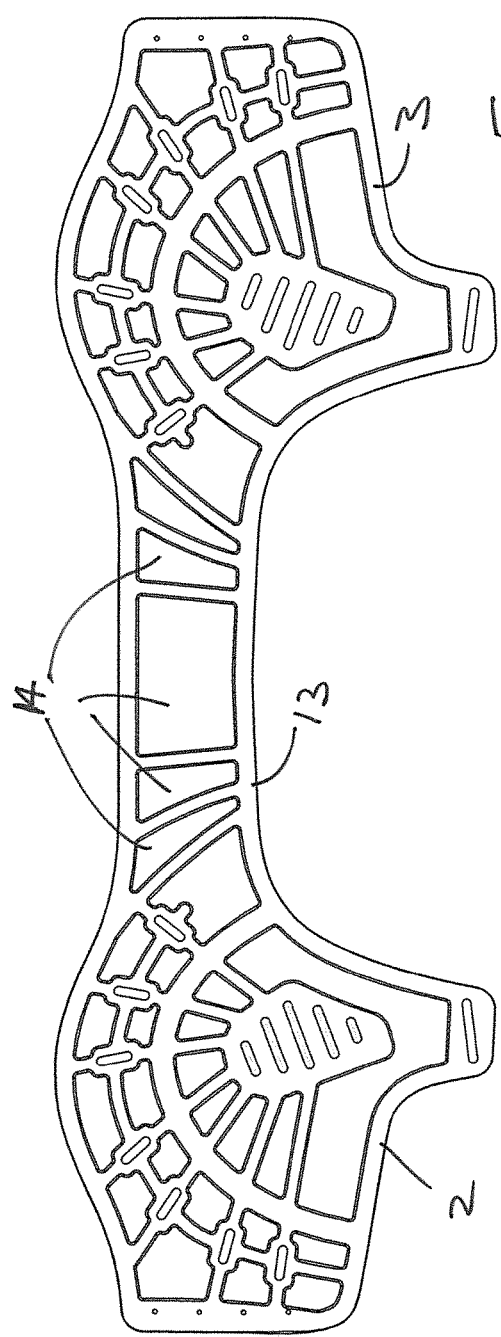
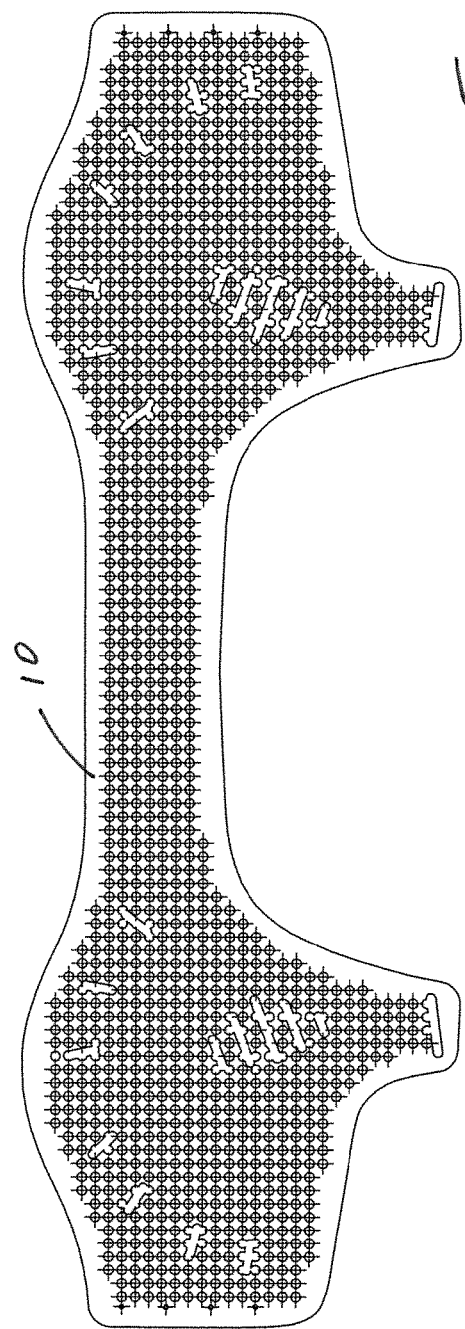

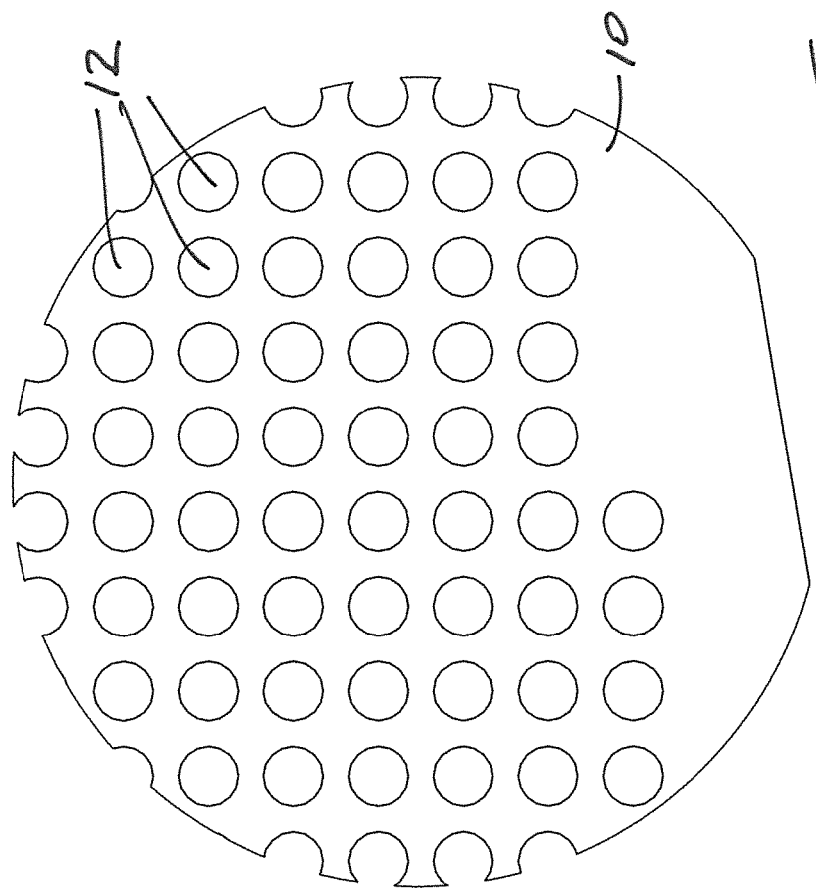

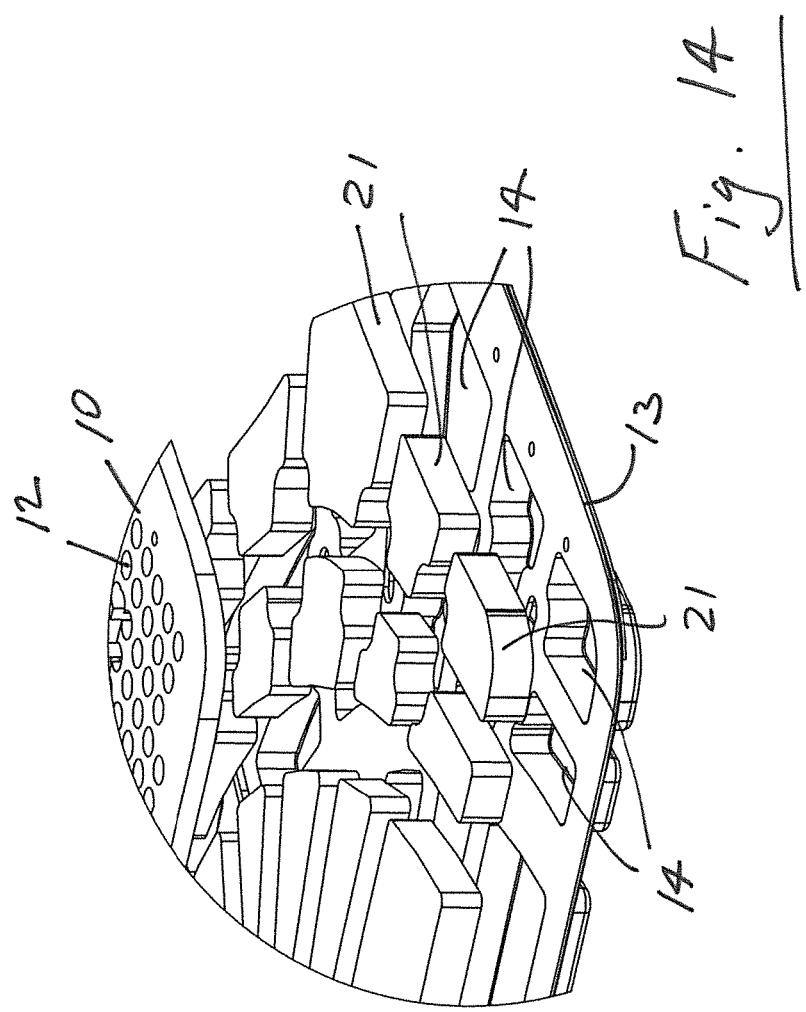

| Brand | g force |
|---|---|
| Brand A: Impact 1 | 396.72 |
| Brand A: Impact 2 | 497.91 |
| Brand B: Impact 1 | 309.77 |
| Brand B: Impact 2 | 427.66 |
| Contego Impact 1 | 92.55 |
| Contego Impact 2 | 120.37 |

Rotational Acceleration (% Reduction)

| Headgear | Impact | 2 m/sec | 3 m/sec | 4 m/sec |
|---|---|---|---|---|
| BARE HEAD | 1 | 0% | 0% | 0% |
| BARE HEAD | 2 | 0% | 0% | 0% |
| Contego 1 | 1 | -60% | -40% | -30% |
| Contego 1 | 2 | -56% | -38% | -29% |
| Contego 2 | 1 | -54% | -38% | -30% |
| Contego 2 | 2 | -51% | -37% | -29% |

Fig. 30

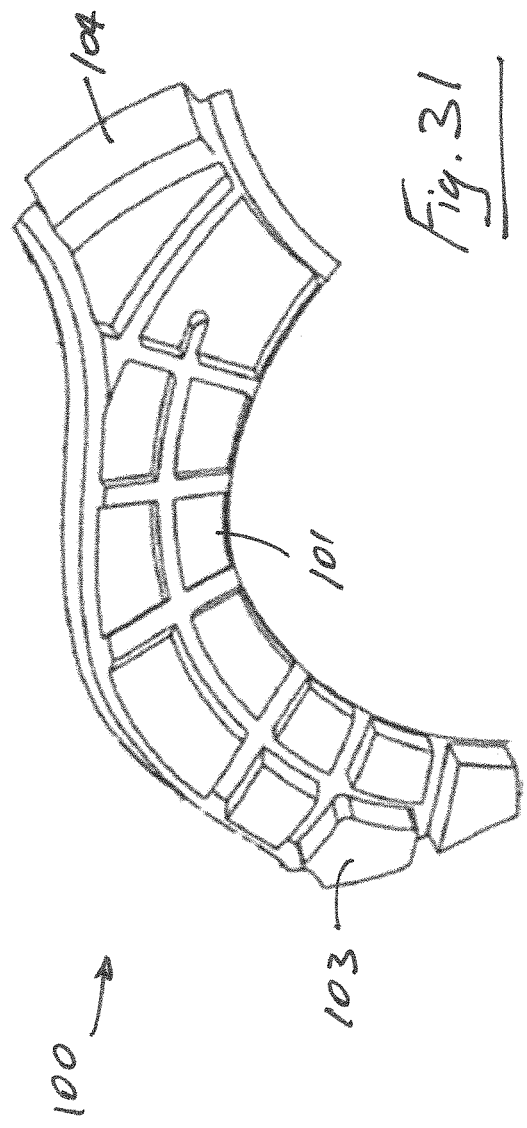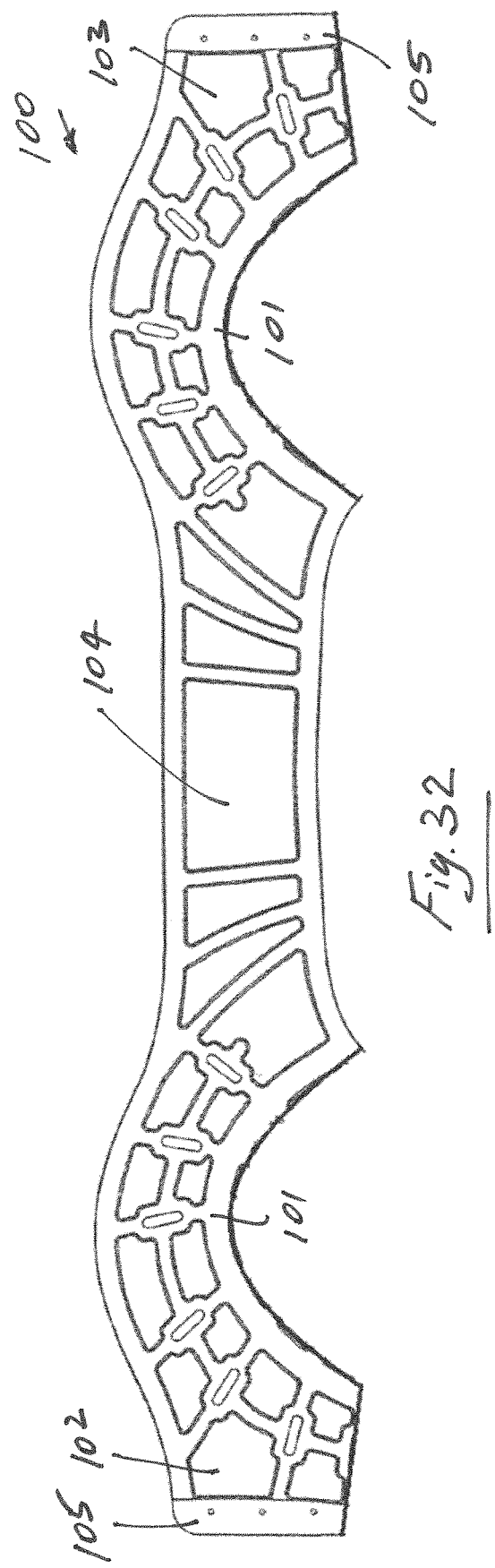

PROTECTIVE HEADGEAR

INTRODUCTION

There is a lack of consensus amongst the sports, scientific and clinical communities concerning terminology for the clinical syndromes associated with trauma to the brain. The term Mild Traumatic Brain Injury (mTBI) is often used interchangeably with Concussion. It is defined as an injury to the head that results in clinically-recognisable somatic, cognitive and emotional symptoms. It does not necessarily result in loss-of-consciousness (LOC) (Kaufman, 2013).

Concussion and head injuries are a major problem in high impact sports. There is a common consensus among medical experts that G-Force energy transferred to a player's head during impact; is one of the major factors in sports-induced brain injury.

The Rugby Football Union (RFU) Injury audit for the 2015/16 season, showed that for the fifth consecutive season, concussion was the most common injury sustained by players in the English Premiership Rugby, constituting 25% of all match injuries. There were 113 match concussions. 17% of the players included in the study sustained 1 or more match concussions, with 86% of them occurring during match play. Source:
http://www.englandrugby.com/mm/Document/General/
General/01/32/25/17/1516_PRISP_Annual_Report_FI-
NAL(withcontentspage)_English.pdf Concussion is a very serious issue which has gained significant public attention and has become the most troublesome injury facing sports medicine physicians, rugby players and World Rugby, alike. The frequency and the impact of concussion-related problems have instigated the investigation of the effect of repeated concussion on the long term health and safety of players.

Protective headgear in rugby is commonly referred to as a 'Scrum Cap'. Scrum caps are intended to prevent cuts, abrasions and cauliflower ears.

Currently available scrum caps are governed by World Rugby Regulation 12 (last updated Jan. 3, 2017).

The World Rugby Regulations specify that a player may wear headgear made of soft and thin materials provided, that no part of the headgear is thicker than 1 cm when uncompressed, and that no part of the headgear has a density of more than 45 kilograms per cubic metre. However, known headgear only offer minimal impact protection and do not reduce the incidence of concussion.

While Rugby headgear is intended to provide protection, concussions are still prevalent in the sport. A 2011 study of 4000 players funded by the International Rugby Board (IRB) found that current headgear "might prevent superficial grazes but it won't prevent concussions".
(Reference: http://www.irishexaminer_com/sport/rugby/
medical-study-finds-scrum-caps-fail-to-prevent-head-in-
juries-177733.html)

In addition to lack of impact protection there are several additional problems with conventional scrum caps which have been identified by players. Some of these problems are:
players feel too hot wearing them
affected player's hearing
affected player's peripheral vision
uncomfortable, badly fitted, etc.

Rugby players need to be able to hear referees and team mates throughout play, they also need to be able to see clearly and move with speed.

The technical problem of achieving adequate protection from concussion to the player, combined with the practical requirements of a rugby player, has not as yet been met.

This invention is directed towards providing rugby headgear protection which will address at least some of these problems. The invention is also directed to providing headgear which will provide protection in other sports involving impacts to the head.

STATEMENTS OF INVENTION

According to the invention there is provided protective headgear comprising a main body comprising:—
an inner wicking layer;
an outer barrier layer; and
an intermediate section between the inner and the outer layers, the intermediate section comprising an impact resistant foam having a density of from 100 to 300 $kg/m^3$.

The impact resistant foam is preferably an open cell foam. In one embodiment the impact resistant foam is a polyurethane foam.

In one case the intermediate section comprises an impact resistant open cell polyurethane foam having a density of from 150 to 250 $kg/m^3$, the intermediate section may comprise an impact resistant open cell polyurethane foam having a density of about 190 $kg/m^3$.

In one embodiment the intermediate section comprises an inner foam layer and an outer foam layer.

The inner layer may comprise open cell polyurethane foam. The inner foam layer may be of an impact resistant open cell polyurethane foam having a density of from 100 to 300 $kg/m^3$, a density of from 150 to 250 $kg/m^3$, or a density of about 190 $kg/m^3$.

In one embodiment the inner open cell foam layer has a first thickness and the outer open cell foam section has a second thickness which is greater than the first thickness.

In one case the second thickness is from 1.5 to 5 times the first thickness, from 1.5 to 3 times the first thickness. The second thickness may be about 2 times the first thickness. In one case the inner layer is 3 mm in thickness and the intermediate section pieces are 6 mm in thickness.

In one embodiment the inner foam layer is perforated. The inner foam layer in some cases comprises from 3 to 5 holes per $cm^2$. The holes may be from 2 to 4 mm in diameter.

In one embodiment the inner layer comprises a wicking fabric bonded to the inner layer of open cell foam.

In one case the outer foam layer comprises a plurality of spaced-apart foam pieces.

In one embodiment the outer barrier layer comprises a plurality of pockets.

In one case the intermediate section comprises foam pieces and the outer barrier layer pockets are configured to receive the foam pieces.

The outer barrier layer may comprise closed cell foam.

In one case the outer barrier layer comprises a polyethylene closed cell foam.

In one embodiment an outer fabric is bonded to the barrier layer.

In one case the main body comprises a pair of side head parts connected by a forehead part and a crown part extending from the forehead part, the main body being shaped to encompass the head of a wearer. Each side part of the main body may comprise a plurality of through holes for alignment with a wearers ears. Each side part of the main body may comprise a mounting for a chin strap. The chin strap is replaceable.

In one case each side part comprises a lace hole reinforcement part at a side edge thereof.

In another embodiment the main body comprises a pair of side head parts connected by a forehead part, the main body being configured to wrap around the sides, back and forehead of the wearer. The body may be configured to wrap around the head above the ears. Each side part may comprise a lace hole reinforcement part at a side edge thereof.

In a further embodiment the main body comprises a pair of side head parts connected by a forehead part, the main body being configured to wrap around the sides, back and forehead of the wearer. The side head parts and forehead part may be further connected by a material such as fabric on the crown of the wearer. The material may form a cross shape, having a first portion extending between the front and back of the main body, and a second portion extending between each side of the main body.

In one case each side part of the main body has a thickness greater than the remainder of the body. Each side part of the main body may comprise a plurality of through holes for alignment with a wearers ears. Each side part of the main body may comprise a mounting for a chin strap. The chin strap is preferably replaceable. Each side part may comprise a lace hole reinforcement part at a side edge thereof.

In another embodiment the main body comprises a pair of side head parts connected by a forehead part and a crown part extending from the forehead part, the main body being shaped to encompass the head of a wearer. Each side part of the main body may have a thickness greater than the remainder of the body. Each side part of the main body may comprise a plurality of through holes for alignment with a wearers ears. Each side part of the main body may comprise a mounting for a chin strap. The chin strap is preferably replaceable. Each side part may comprise a lace hole reinforcement part at a side edge thereof.

In the protective headgear of the invention, G-Force energy transferred to a wearers head during impact is significantly reduced. G-Force energy transferred to a wearers head during impact in some cases is less than 150, less than 120.

According to the invention there is provided protective headgear comprising a main body, comprising an inner layer, an outer barrier layer, and an intermediate section of impact resistant foam between the inner and the outer layers. In a preferred embodiment the intermediate section comprises an impact resistant open cell polyurethane foam. Preferably the open cell polyurethane foam has a density of from 100 to 300 kg/m$^3$. Preferably the inner layer is of a wicking material.

In one embodiment the intermediate section comprises an impact resistant open cell polyurethane foam having a density of from 150 to 250 kg/m$^3$ In one case the inner layer comprises a sheet of open cell polyurethane foam. The inner layer may be of an impact resistant open cell polyurethane foam having a density of from 100 to 300 kg/m$^3$. In one case the inner layer is of an impact resistant open cell polyurethane foam having a density of from 150 to 250 kg/m$^3$.

In a preferred embodiment the inner foam layer is perforated. The inner foam sheet in one case comprises from 3 to 5 holes per cm$^2$. The holes are typically from 2 to 4 mm in diameter.

In one embodiment the inner layer comprises a wicking fabric bonded to the inner layer of open cell foam.

In one case the outer barrier layer comprises a plurality of pockets. In one embodiment the intermediate foam section comprises portions inserted into the pockets.

In one embodiment the outer barrier layer comprises closed cell foam. The outer barrier layer in one case comprises a polyethylene closed cell foam. In one case an outer fabric is bonded to the outer barrier layer which may be of a closed cell foam.

In one embodiment the inner open cell foam layer has a first thickness and the outer open cell foam section has a second thickness which is greater than the first thickness. The second thickness in one case is from 1.5 to 5 times the first thickness, typically the second thickness is from 1.5 to 3 times the first thickness. In one case the second thickness is about 2 times the first thickness.

In one embodiment the main body is shaped to encompass the head of a wearer and comprises a pair of side head parts connected by a forehead part and a crown part extending from the forehead part.

In one embodiment each side part of the main body comprises a plurality of through holes for alignment with a wearers ears.

In one case each side part of the main body comprises a mounting for a chin strap. Preferably the chin strap is replaceable.

In one embodiment each side part comprises a lace hole reinforcement part at a side edge thereof.

BRIEF DESCRIPTION OF THE DRAWINGS

The invention will be more clearly understood from the following description of an embodiment thereof, given by way of example only, with reference to the accompanying drawings, in which:

FIG. 8 is a plan view of an assembly used to form the headgear;

FIG. 9 is a plan view of side parts of the headgear;

FIG. 10 is an exploded view of the side parts of the headgear;

FIG. 11 is a plan view of an exterior element of the side parts;

FIG. 12 is a plan view of a perforated foam element of the side parts;

FIG. 13 is an enlarged view of a detail of the perforated foam element of the side parts;

FIG. 14 is an enlarged view of an assembly of the outer layer, open cell foam elements and the perforated foam element of the side parts;

FIG. 30 is a chart of test results for Rotational Acceleration testing;

FIG. 31 is a side view of protective headgear such as soccer headgear according to the invention;

FIG. 32 is a plan view of protective headgear such as soccer headgear according to the invention;

DETAILED DESCRIPTION

Figure 1:
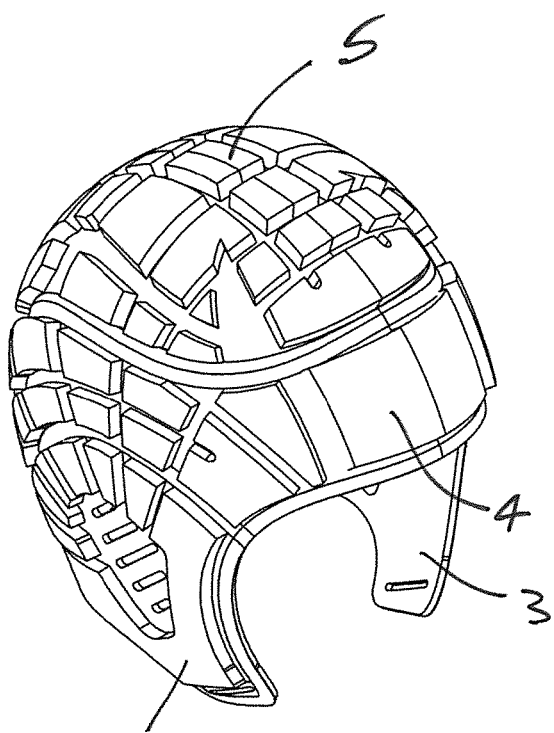
FIGS. 1 to 7 are elevational views of protective headgear such as rugby headgear according to the invention.
Figure 2:
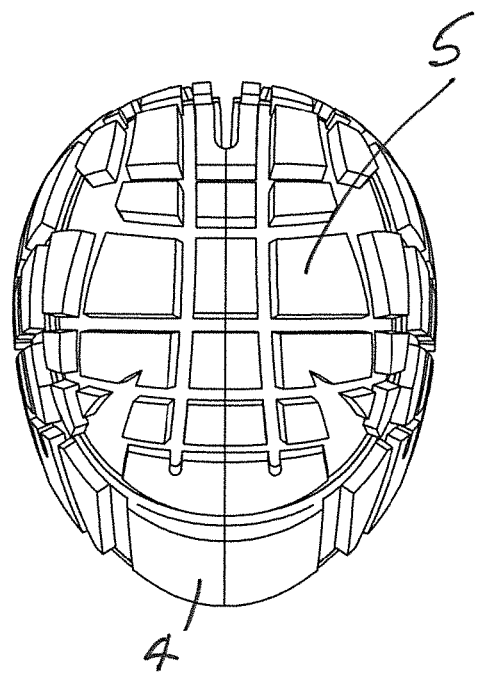
Figure 3:
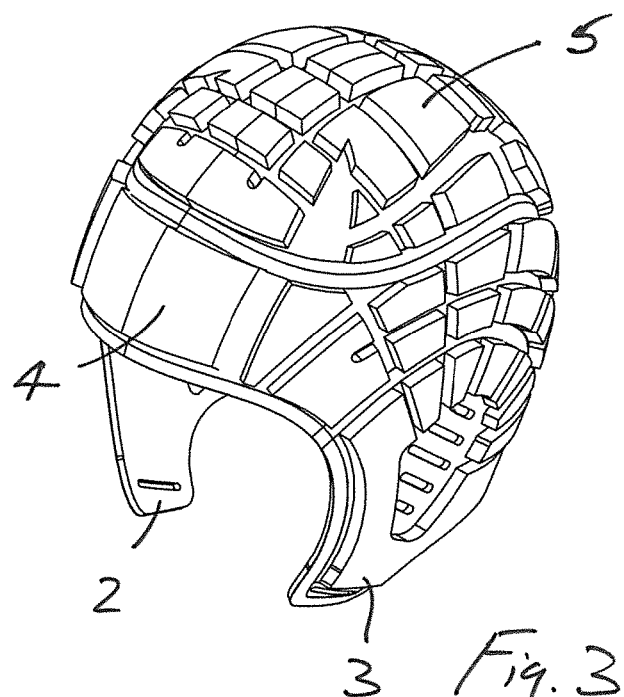
Figure 4:
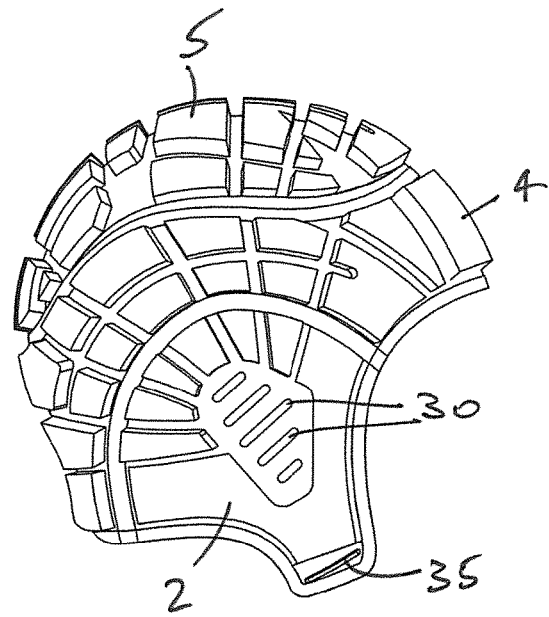
Figure 5:
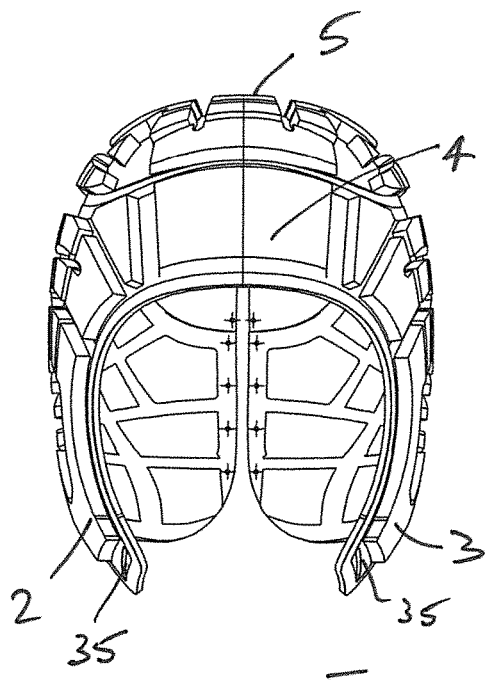
Figure 6:
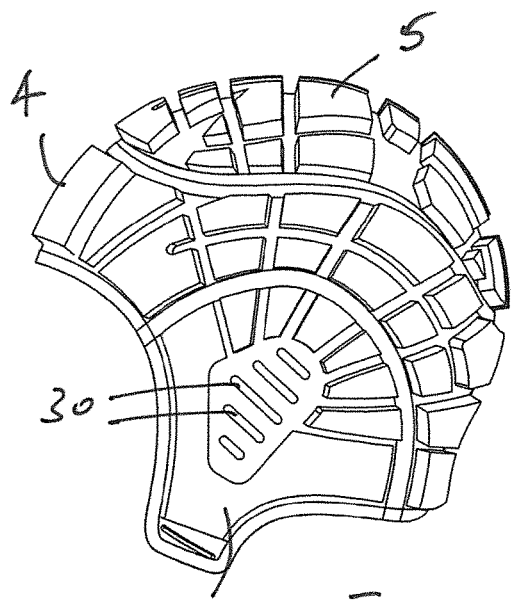
Figure 7:
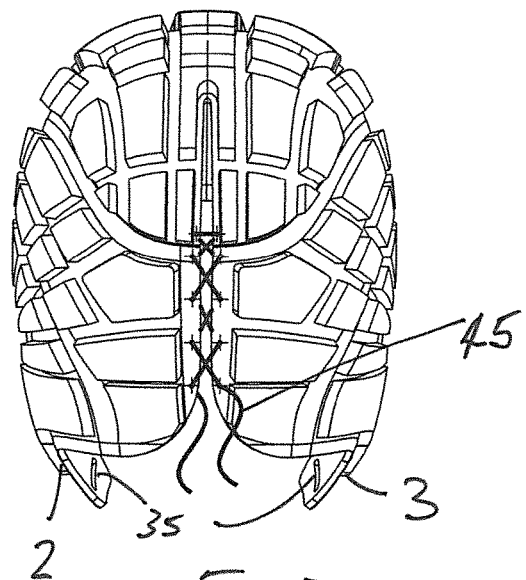
Figure 15:
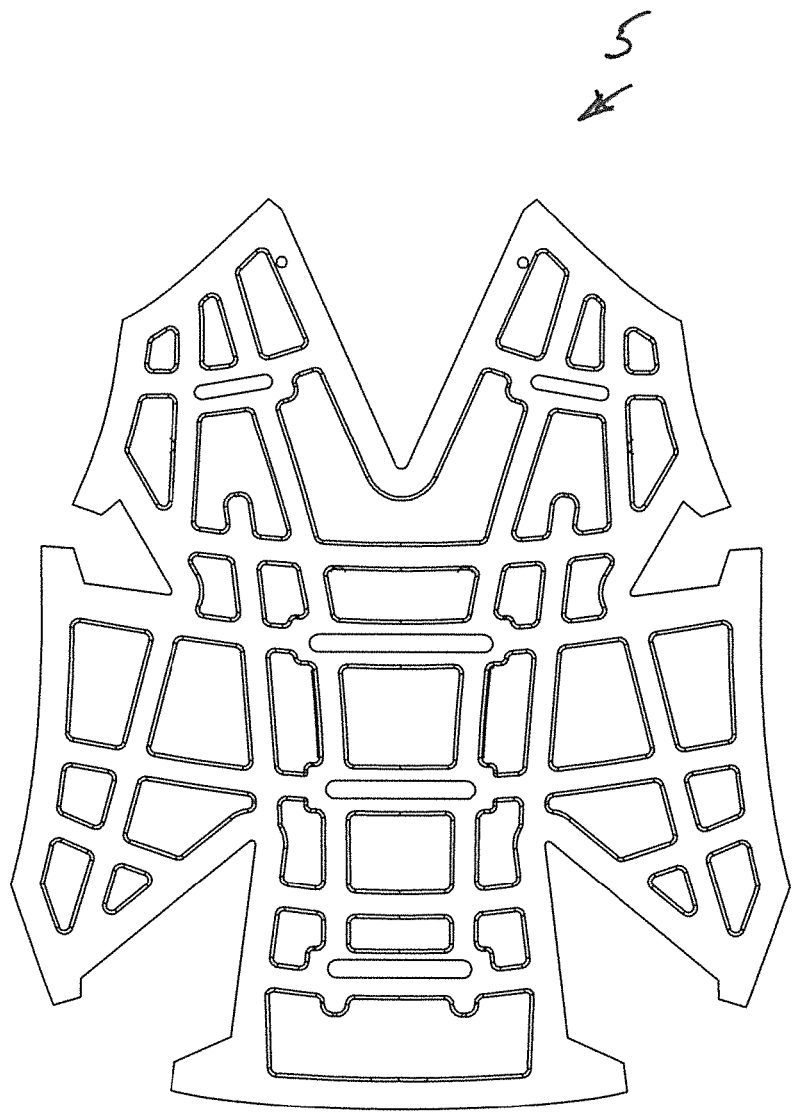
FIG. 15 is a plan view of a crown part of the headgear.
Figure 16:
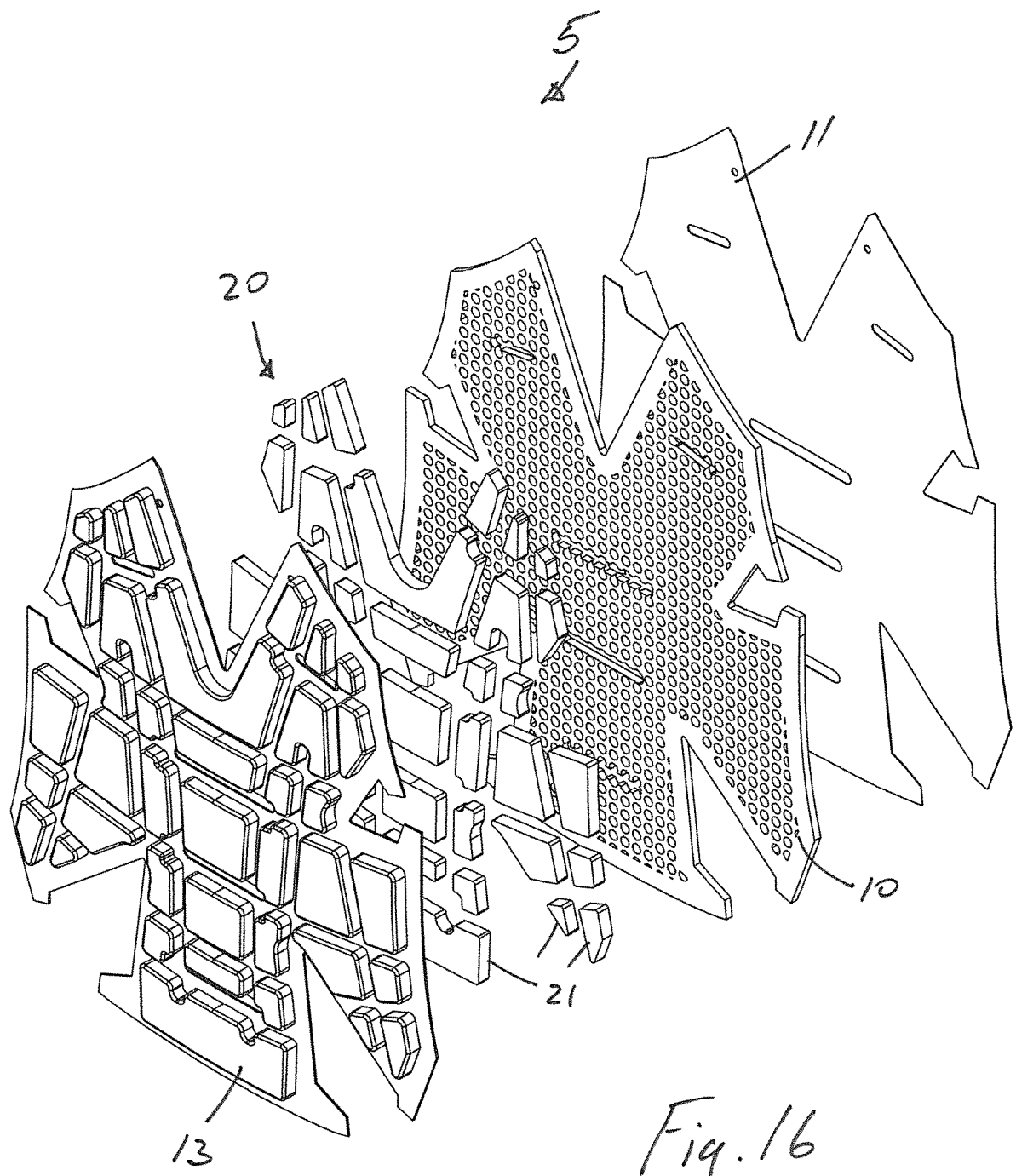
FIG. 16 is an exploded view of the crown part of the headgear.
Figure 17:
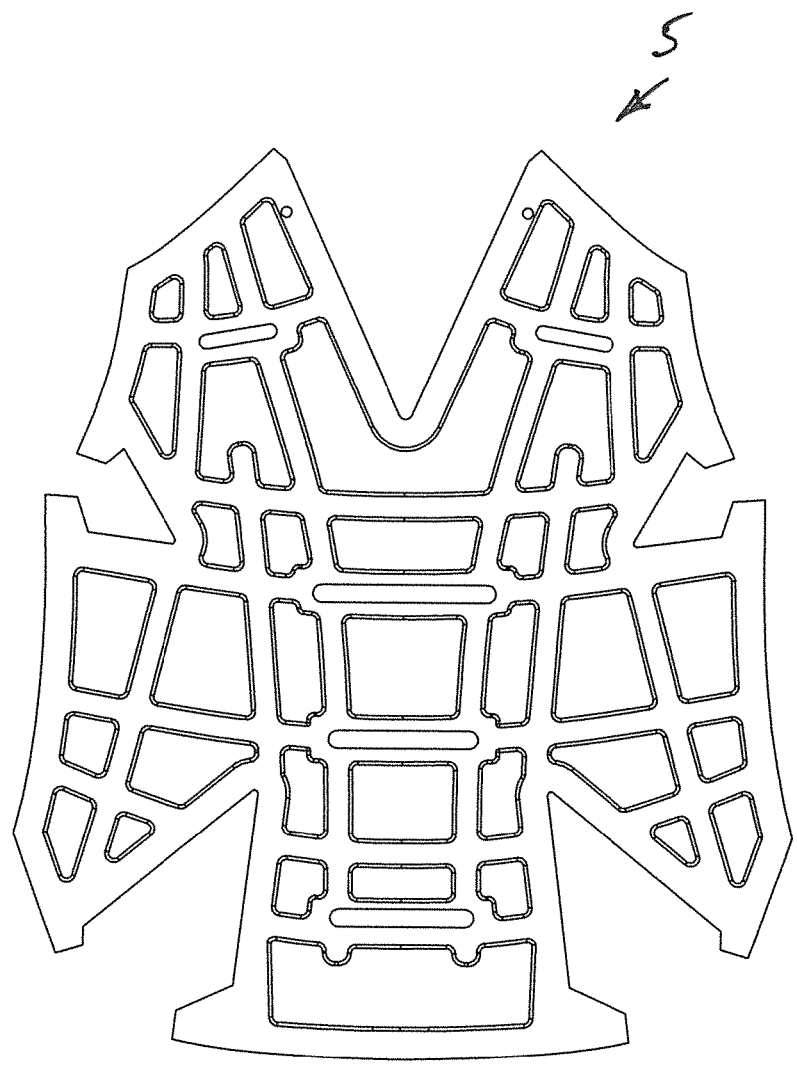
FIG. 17 is a plan view of an exterior element of the crown part.
Figure 18:
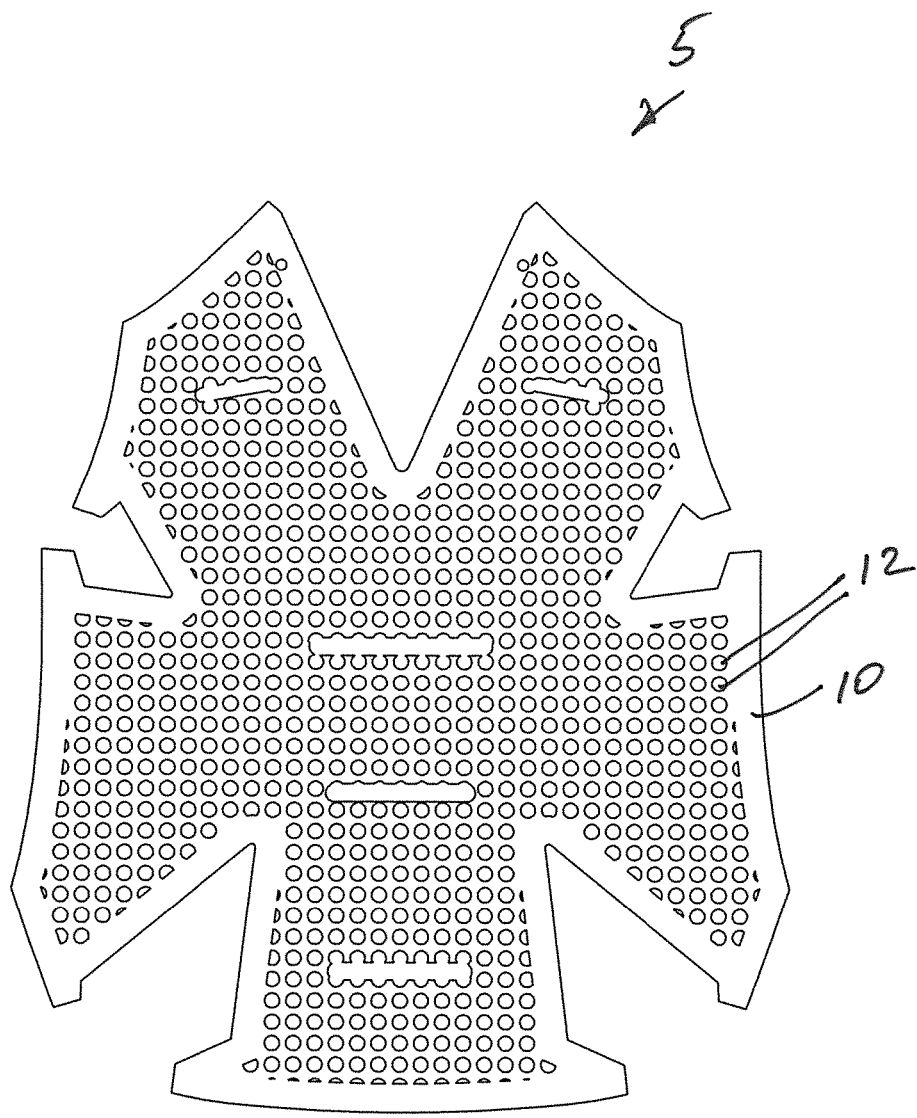
FIG. 18 is a plan view of the perforated foam element of the crown part.
Figure 19:
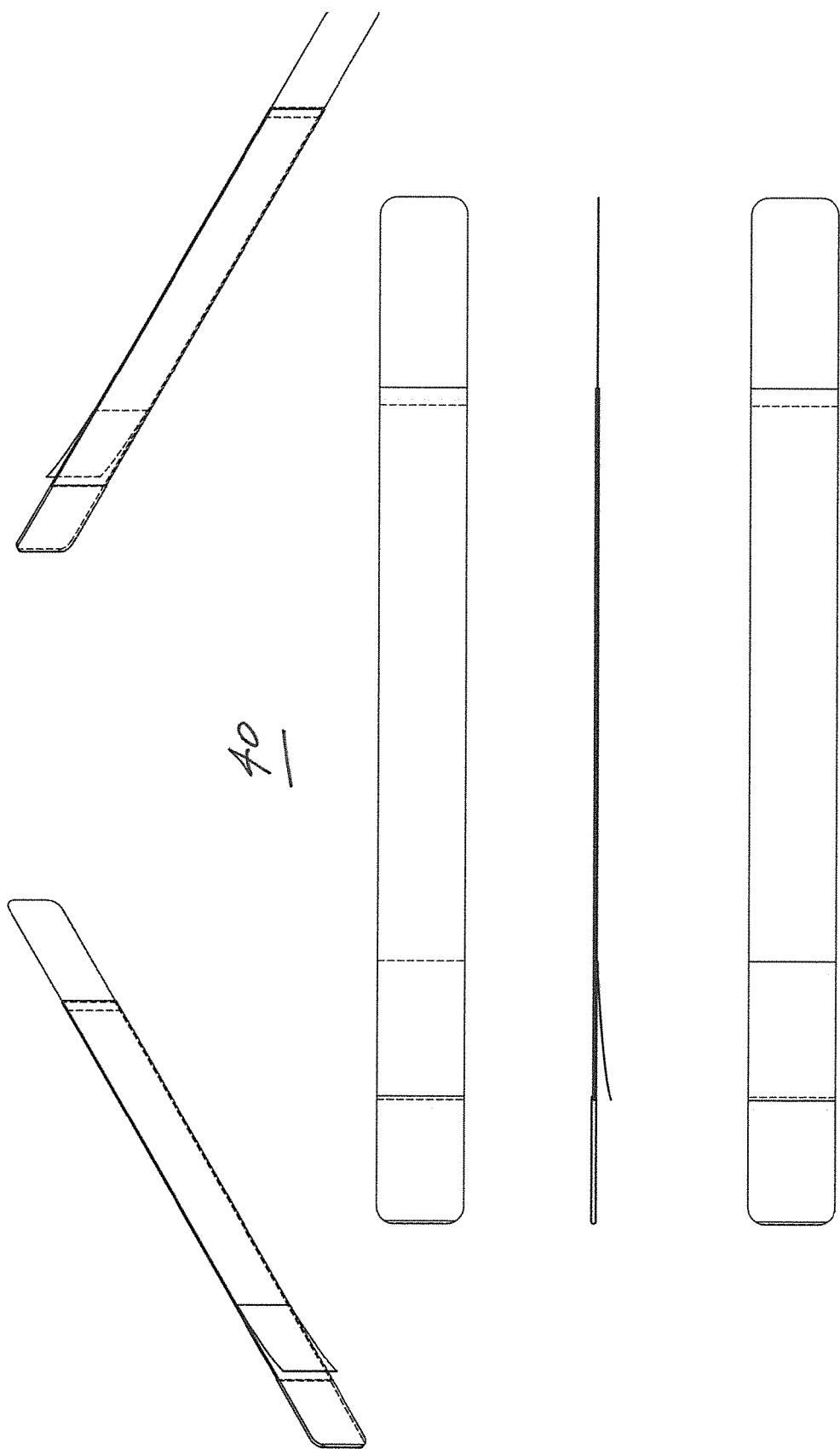
FIG. 19 is a series of views of a chinstrap of the headgear.
Figure 20:
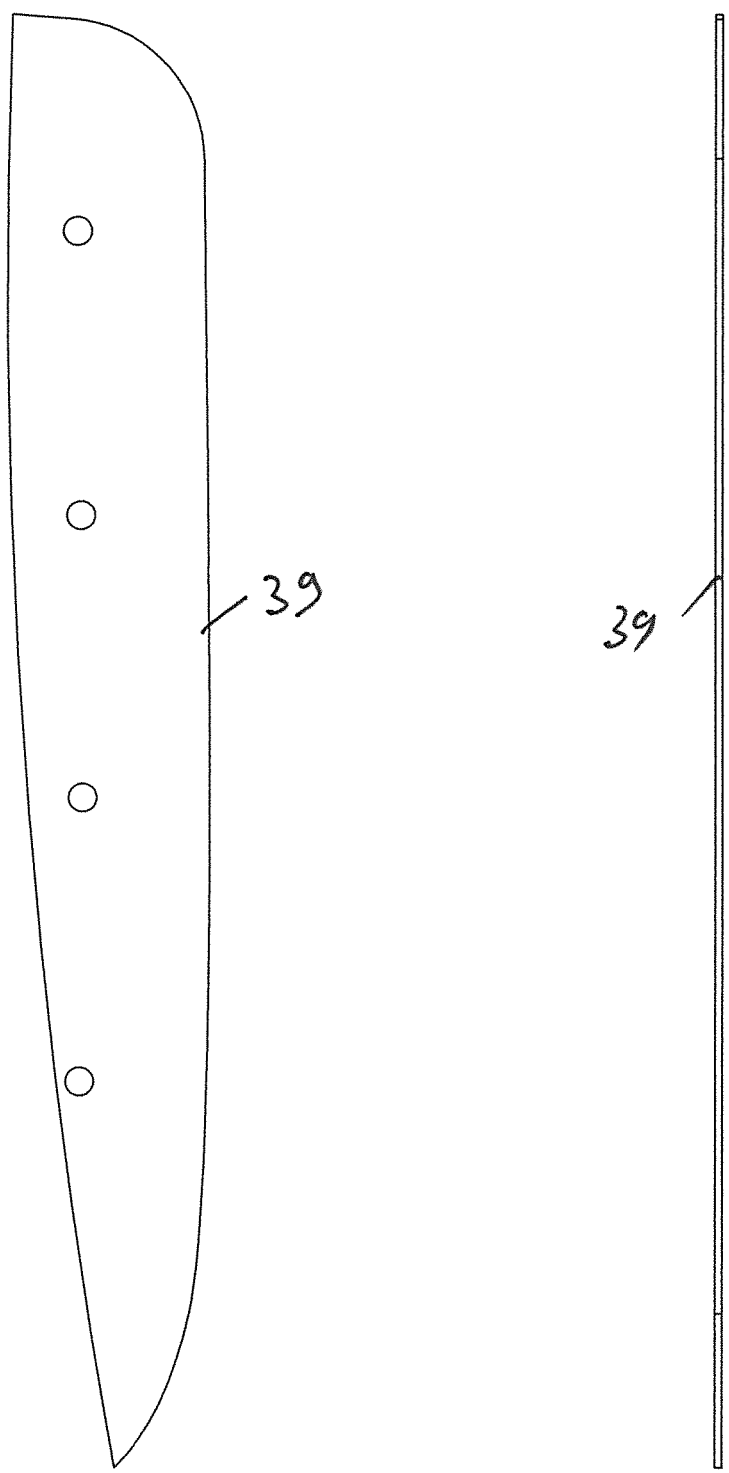
FIG. 20 is a view of a lace-hole reinforcement patch of the headgear.
Figure 21:
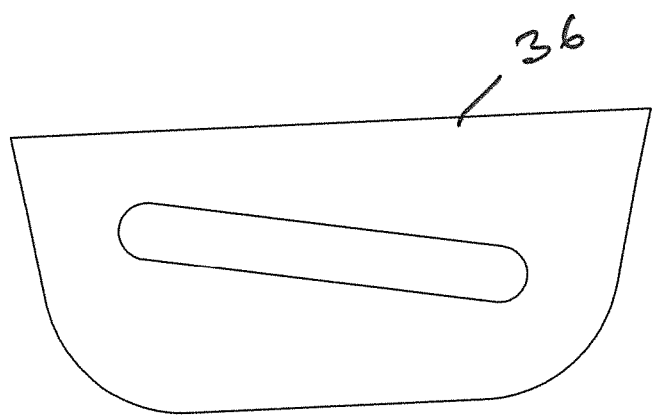
FIG. 21 is a view of a strap-reinforcement patch of the headgear.

We describe rugby scrum caps which have the benefit of initially appearing not dissimilar to a typical rugby scrum cap. In various embodiments, it is not significantly thicker, allows for adequate hearing and visibility, and significantly reduces a major risk factor in sports induced mTBI/concussion to the player, impacts to the head.

In order to achieve the protection required to the head in order to reduce the risk of mTBI/concussion, it has been found that an increased density of the scrum cap is required. This is achieved by a combination of materials.

The headgear of the invention has showed a vast improvement for impact performance on known scrum caps. The headgear of the invention reduces the incidence and/or severity of significant alterations in clinically measurable mTBI indicators (both behavioural and neurological blood biomarkers) and thereby enhances player's performance and maximises their safety. The headgear of the invention significantly reduces the G-Force of linear and rotational impacts transferred to the player's head.

Referring to the drawings and initially to FIGS. 1 to 21 thereof there is illustrated protective headgear according to the invention which in one case is rugby headgear. The headgear comprises a main body 1 which encompasses a wearer's head. The main body 1 has side head parts 2, 3 connected by a forehead part 4 and a crown part 5 extending from the forehead part 4. The crown part 5 may be formed separately from the side and forehead parts and subsequently joined to the forehead part 4, for example by stitching.

Each part of the main body 1 comprises a number of layers. There is an inner foam layer 10 of an open cell polyurethane foam material. The inner foam layer 10 comprises a sheet of foam which is perforated with a plurality of holes 12, preferably from about 3 to 5 holes per cm². The holes assist in wicking away sweat generated by the wearer and are preferably from 2 to 4 mm in diameter. A wicking fabric such as Nylon wicking fabric 11 is bonded, for example using a suitable adhesive, to the wearer engaging face of the inner perforated foam sheet 10.

The inner foam layer provides additional impact protection to the head protector. The perforated holes also assist in reducing the heat of the player's head by helping the sweat to be drawn away from the player's head. The perforated holes also assist in reducing the overall mass of the head protector.

The main body 1 also comprises an outer barrier layer 13 which in this case is of a closed cell foam material such as a polyethylene foam. The outer barrier layer 13 is formed to provide a plurality of outwardly facing pockets 14. An outer fabric 15 such as a stretch Nylon is bonded to the external face of the barrier foam layer 13 in a suitable manner, for example using a hot melt adhesive. The headgear has a soft rather than a hard shell.

The barrier layer 13 is moulded to form the pockets 14 that hold intermediate foam pieces 21 in place. The outer barrier layer 13 can be made from a closed cell polyethylene foam that is waterproof to prevent excess rain and moisture from entering the head protector, in use. This ensures that the mass of the head protector does not increase in wet conditions and remains comfortable for a player.

An intermediate section 20 of an open cell polyurethane foam material is provided between the outer barrier layer 13 and the inner layer. In this case, the intermediate foam section 20 comprises a plurality of portions/pieces 21 which are sized to engage in the pockets 14 of the outer barrier/layer 13.

The open cell foam of both the internal foam layer and the intermediate foam section is an impact resistant polyurethane foam which consists of a branched polyether-based polyol and a chain extender. The foam has a density in the range of from 100 to 300 kg/m³, preferably from 150 to 250 kg/m³, most preferably about 190 kg/m². Such foams are available from suppliers including Dow Automotive, Dow Corning, Rogers Corporation, Sorbothane Inc., and DuPont.

The intermediate foam section 20 provides the majority of the impact protection of the product. The foam has a relatively low density which ensures that the head protector is lightweight. The foam is soft to touch which makes it comfortable to wear on the head. The softness of the foam also facilitates profiling to the contours of the head during manufacturing. Unlike crushable foams that are commonly used in sports helmets the foam 20 is able to recover from multiple impacts, to give impact protection throughout a game. Studies have shown that the average number of impacts to the head in a game of rugby is 77.

Figure 23:
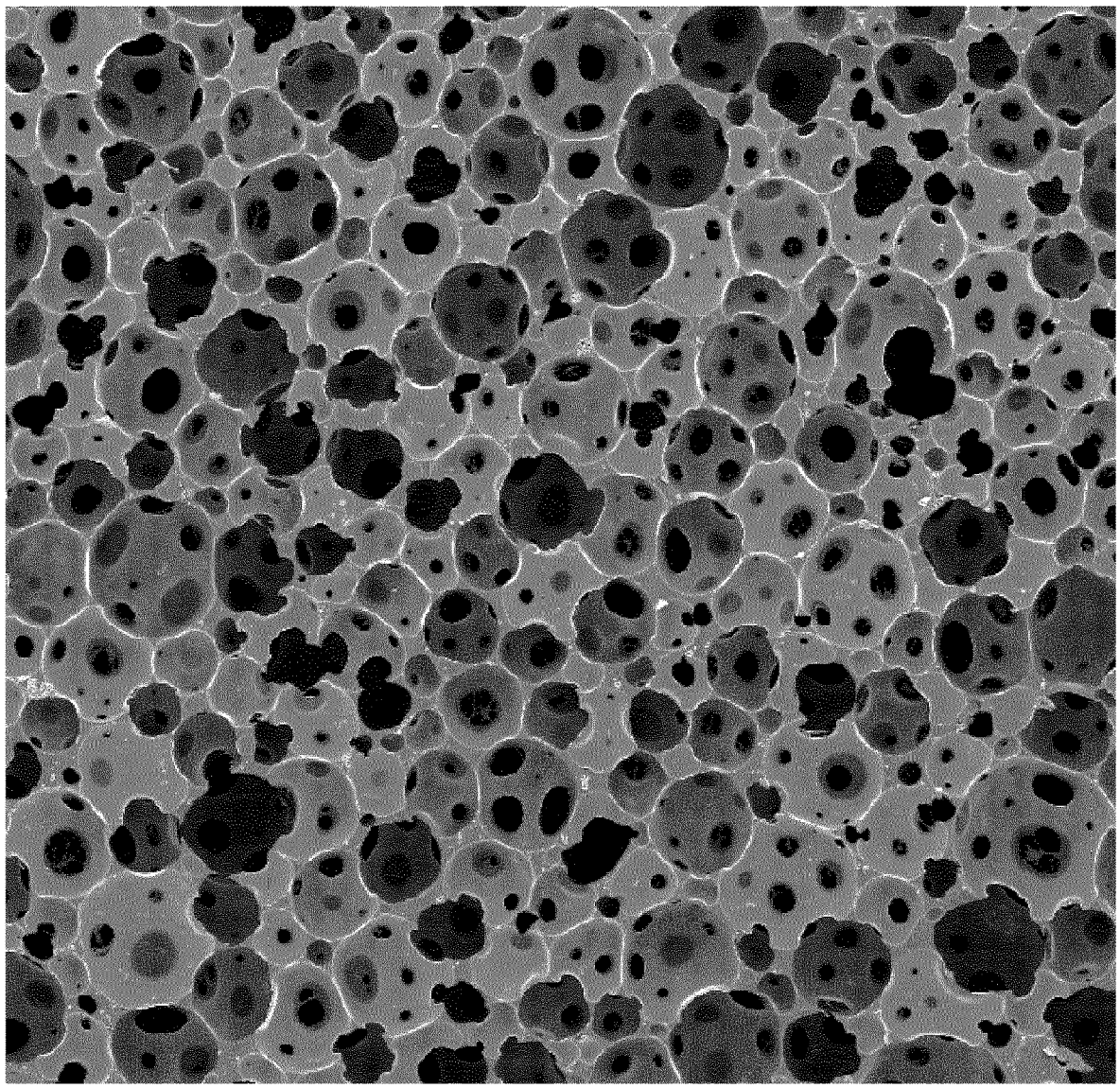
FIG. 23 is a micrograph of the open cell foam used in the headgear of the invention.

The headgear of the invention dissipates the impact energy through the cellular microstructure of the open cell foam used in the construction of the headgear. The open cell foam may have hard and soft segments. The soft segments absorb and dissipate the energy of the impact. The hard segments provide rigidity, shape and form to the foam. A typical micrograph of the open cell foam is illustrated in FIG. 23.

The inner open cell perforated foam sheet 10 has a first thickness and the intermediate open cell foam section pieces 21 have a second thickness which is greater than the first thickness, in the order of 1.5 to 5 times, preferably from 1.5 to 3, typically about 2 times greater in order to minimise the weight of the head protector. In one case the perforated foam sheet 10 is 3 mm in thickness and the foam section pieces 21 are 6 mm in thickness.

The side head parts 2, 3 have a plurality of through holes 30 for alignment with a wearers ears to ensure that the headgear does not interfere with the wearer's hearing. Each side part 2, 3 also comprises a slot 35 for mounting a chin strap 40 to the headgear. In the invention, the chinstrap is replaceable. The advantage is that if the stickiness of the Velcro declines due to wear and tear in use, the chinstrap may be replaced without having to replace the head protector. There are also reinforcement pieces 36 for re-enforcing the headgear in the region of the chin strap holes 35. Each of the side parts 2, 3 also has a lace hole reinforcement part 39 at a side edge thereof, through which a lace 45 is led as shown, for example in FIG. 7. The lace 45 allows the size of the headgear to be adjusted to suit a wearer.

To manufacture protective headgear according to the invention an outer fabric layer is laminated to a sheet of polyethylene foam which is used to form the outer barrier layer 13. The laminate is then moulded to provide a plurality of pockets 14. The laminate is die cut to provide the crown 5 and side parts 2, 3 and forehead 4 shapes. The side parts 2, 3 and the forehead 4 parts are all formed as a single piece that wraps from your ear, around the forehead, to the other ear.

A sheet of the closed cell polyurethane foam is then cut-out into pieces 21 which are shaped to conform to the pockets 21 formed in the barrier layer 13. The intermediate foam pieces 21 are inserted and bonded, for example, using an adhesive, into the pockets 21. The crown 5 and side parts 2,3,5 are then assembled together, for example by stitching. The strap 40 and laces 45 are attached to complete the protective headgear.

Figure 22:
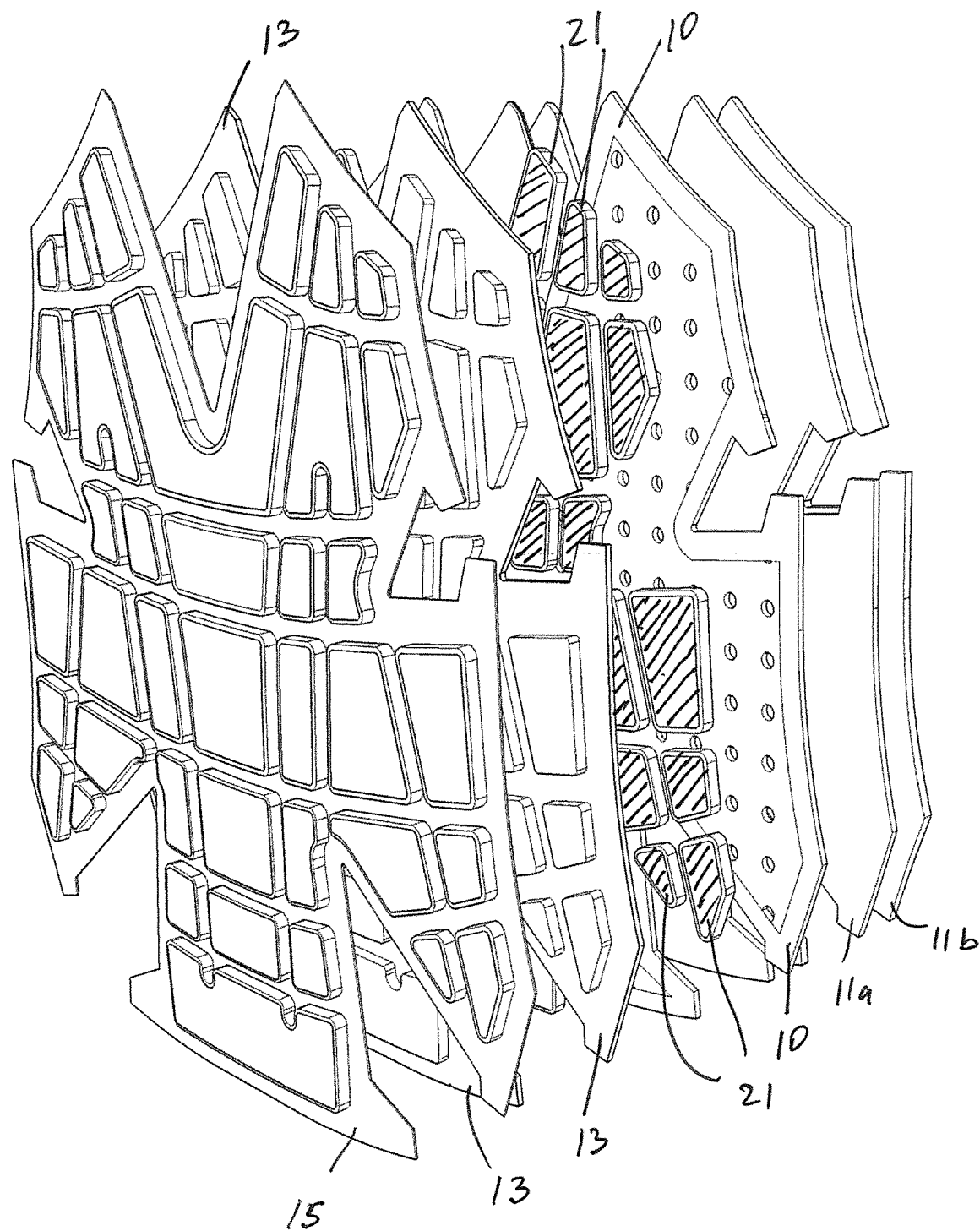
FIG. 22 is an exploded view of the crown part of rugby headgear according to the invention.

Referring to FIG. 22 there is illustrated an exploded view of the crown part of protective headgear of the invention. This is similar to FIG. 16 and like parts are assigned the same reference numerals. The outer fabric layer 15 is included. The innermost liner is illustrated in two components 11a, 11b and combines hydrophilic and hydrophobic sections to enable rapid absorption and quick release of moisture, for example, up to 40 times its own weight. The liner 11 may also incorporate an antibacterial agent for improved hygiene properties.

The headgear of the invention reduces the incidence and/or severity of concussion and thereby enhances player's performance and maximises their safety.

Players using the protective headgear will have improved long term health. The adverse effects of repeated impacts to the head are well known. Further, players will miss fewer games as concussion is the most common rugby injury sustained in matches The protective headgear of the invention significantly reduces the G-Force of linear and rotational impacts transferred to the player's head.

Laboratory testing has showed a vast improvement for impact performance on known scrum caps.

A pre-clinical animal study has also been completed. The data has demonstrated significant reductions of TBI (Traumatic Brain Injury) indicators (behavioural and biomarkers) in a neurological rodent model.

Pre-Clinical Animal Study

A pre-clinical animal study was carried out to validate the performance of the protective headgear of the invention in reducing the incidence of concussion.

The protective headgear of the invention was used to protect rodent test subject skulls while subjected to a controlled impact. The study asked two questions:
1. Did the behaviour of the rodents, protected with the head protector, dramatically change after a controlled impact to the head?
2. Did the blood bio-markers, which are indicative of mTBI, of the rodents protected with the protective headgear, dramatically change after a controlled impact to the head?

The objective of the study was to illustrate proof of concept evidence in a pre-clinical setting with a well validated TBI animal model. The model selected used a controlled impact mechanism, analogous to an impact received in the field of play, a well-characterized concussion pathophysiology and definitive clinical indicators that has close fidelity to concussion in humans Recent publications have used this pre-clinical model and have established a correlation between TBI and clinical read-outs of pathology occurring within the brain such as blood biomarkers and altered gene expression profiles. Viano, D., A. Hamberger, A. Bolouri, and A. Saljo, *Concussion in professional football: Animal model of brain injury*—Part 15, Neurosurgery, 2009, 64, 1162-1173. Mychasiuk, R., Hehar, H., Ma, I., Candy, S., & Esser, M J. (2016). *The direction of the acceleration and rotational forces associates with mild traumatic brain injury in rodents effect behavioural and molecular outcomes*. Journal of Neuroscience Methods. 257, 168-178.

1. Behavioural Analysis Results

The protective headgear of the invention protected rats from concussions resulting from head impact occurring at 5 m/s (37 g). The protective effects were evident in the behavioural measures examining balance, motor coordination, and exploratory locomotion.

(a) Hind-Leg Foot-Slips

Figure 24:
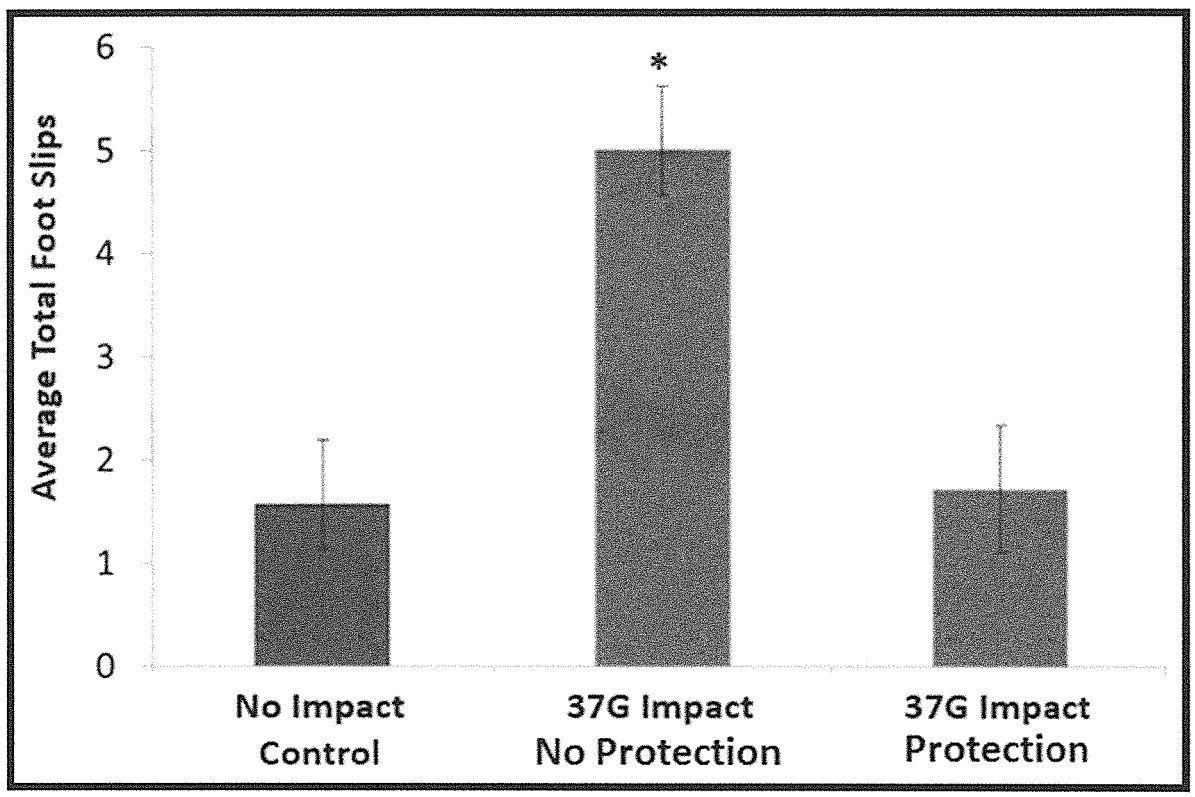
FIG. 24 is a bar chart of hind-leg foot-slips.

Animals in the group that were protected with the protective headgear of the invention did not exhibit impairment in the number of foot-slips or time to cross a beam whereas both of these deficits were present in the non-protected group. See FIG. 24.

(b) Time to Cross Beam

Figure 25:
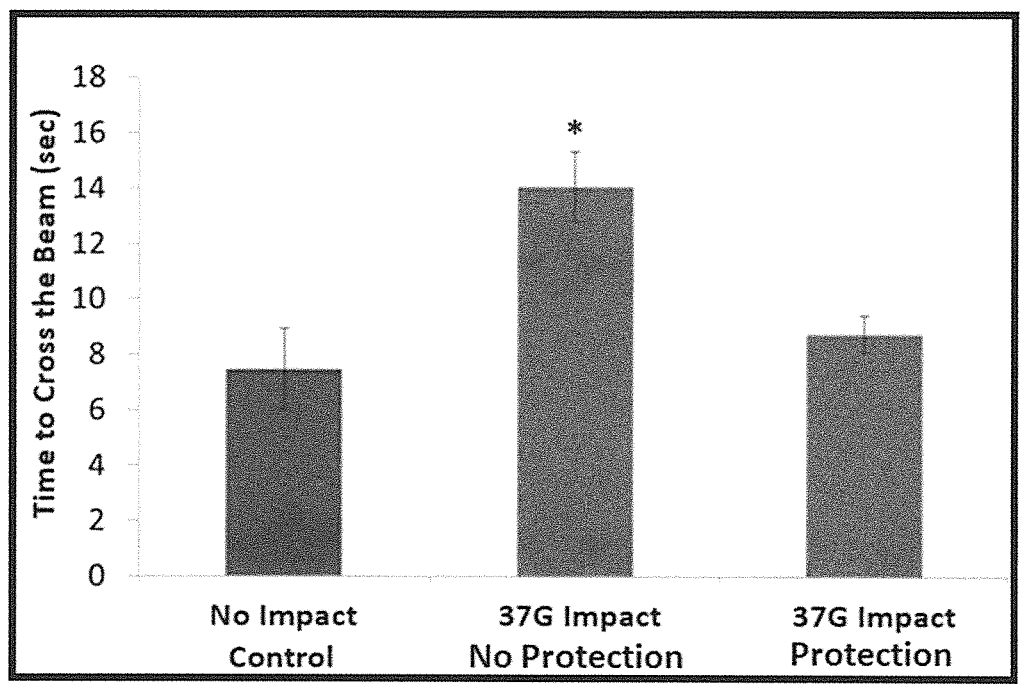
FIG. 25 is a bar chart of time to cross beam.

Animals that had the protective headgear of the invention were indistinguishable from control animals regardless of the impact force, whereas animals without the protective headgear exhibited significant impairment (*$p<0.05$). See FIG. 25.

(c) Distance Traveled

Figure 26:
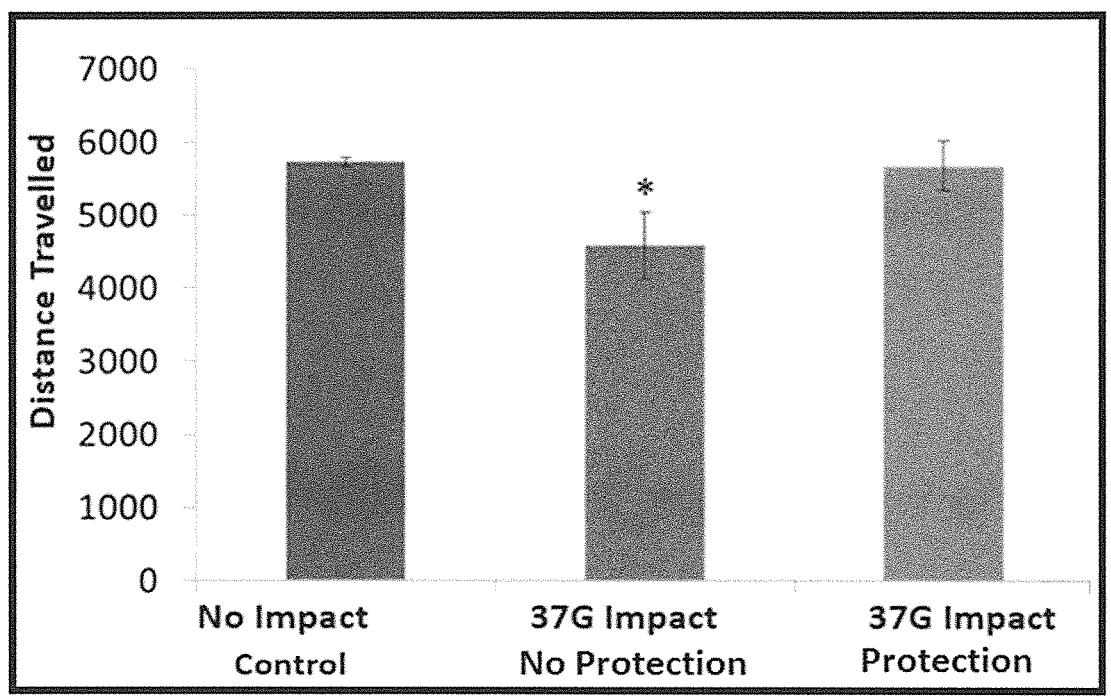
FIG. 26 is a bar chart of distance traveled.

Similar to hind-leg foot-slip findings, animals that experienced an impact at 37 g but were protected with the protective headgear of the invention were indistinguishable from control animals. However, all other animals, exhibited significant impairment in the distance traveled over the 10-minute session. See FIG. 26.

The paths taken by the animals over the course of the 10-minute session were also recorded. Control animals and animals in the 37 g group with the protective headgear of the invention travel further and explore the entire enclosure whereas other animals only investigate half of the arena.

2. Blood Bio-Marker Analysis Results:

The headgear of the invention protected rats from concussions resulting from head impact occurring at 5 m/s (37 g). The protective effects were evident in the biomarker levels of TNF-α and NEFL at 3 hours' post-injury.

(a) NEFL Levels

Figure 27:
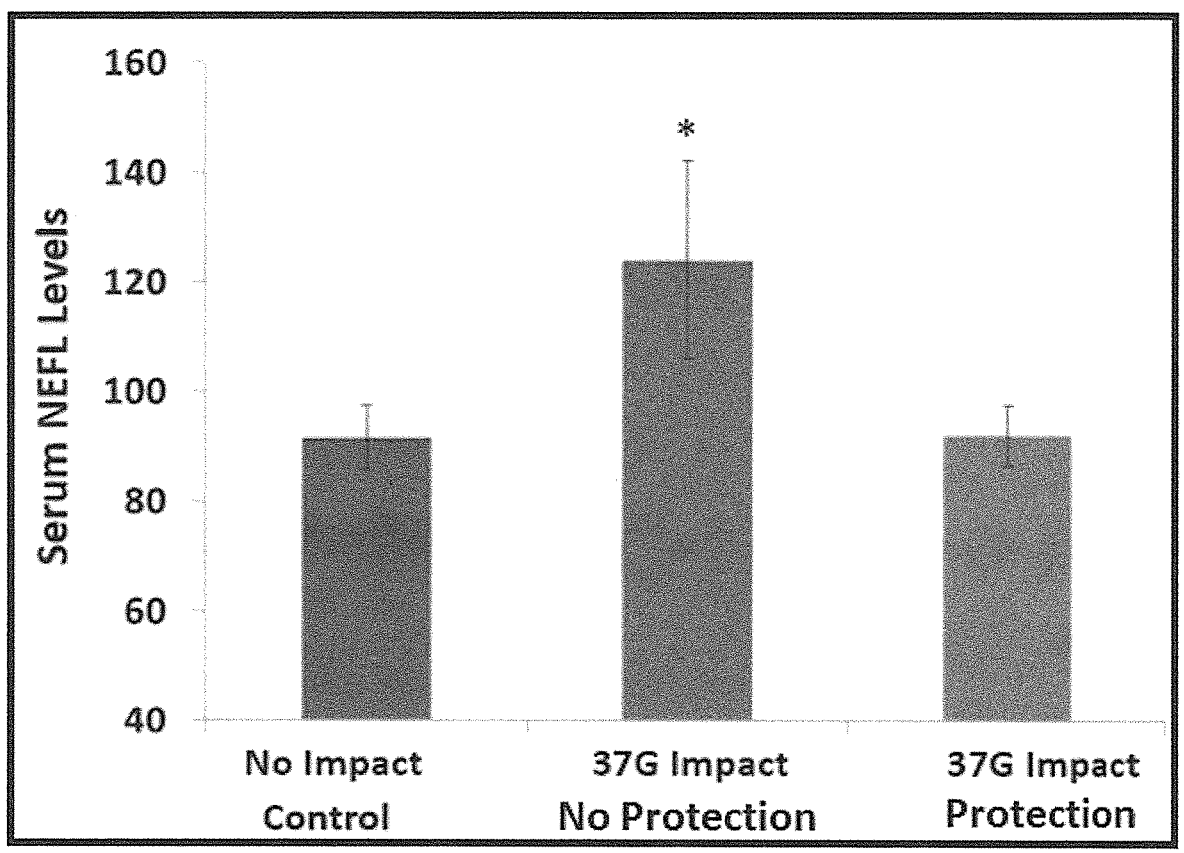
FIG. 27 is a bar chart of NEFL Levels.

The NEFL serum levels demonstrated significant increases in animals that did not have protection. The protective headgear of the invention prevented significant changes in NEF-L at this early time point for impacts, see FIG. 27.

(b) TNF-α Levels

Figure 28:
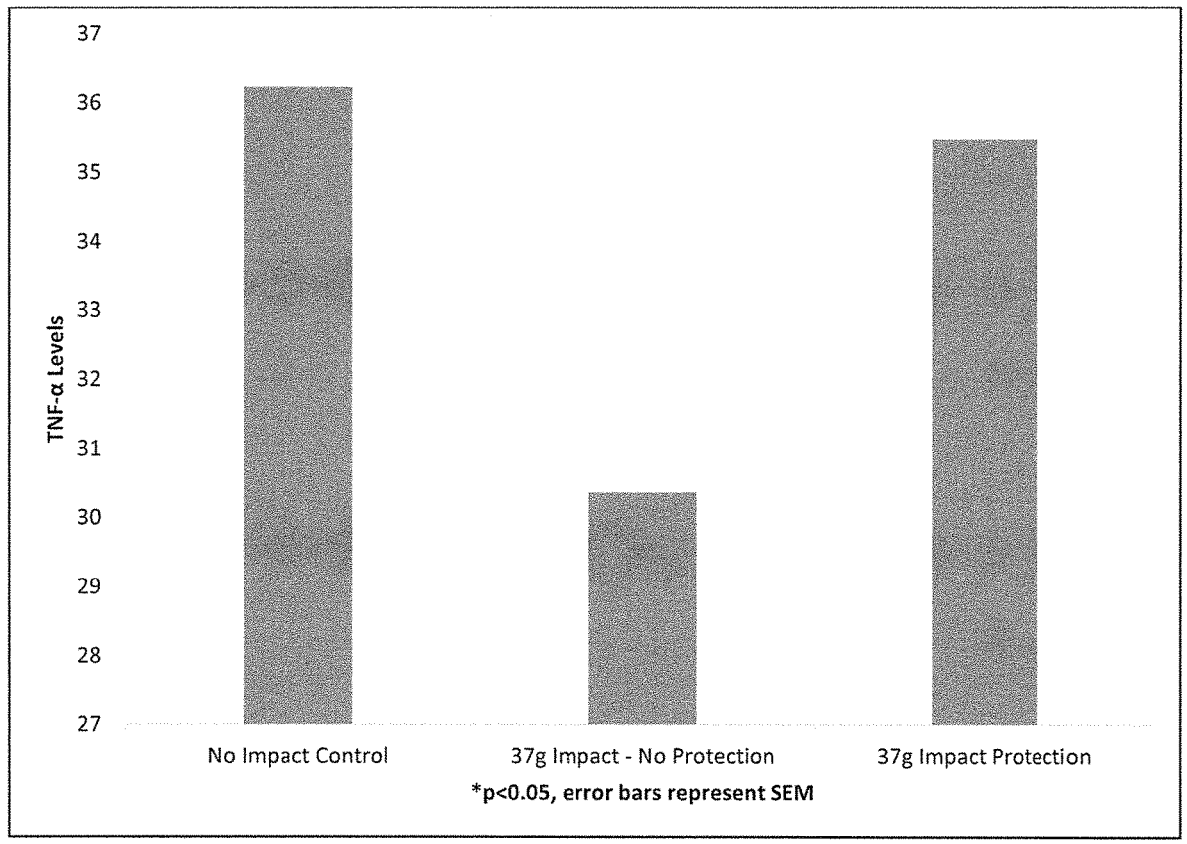
FIG. 28 is a bar chart of TNF-α Levels.

The protective headgear of the invention prevented reductions in TNF-α at 3 hours' post-concussion in the 37 g impact group (*$p<0.05$), see FIG. 28.

Linear Impact Testing

Several rounds of impact drop testing were carried out to validate the performance of the protective headgear of the invention in reducing linear impact forces. The objectives of the impact drop tests were:
  i. Did the protective headgear of the invention reduce the linear impact force transmitted to a players' head?
  ii. Did the protective headgear of the invention reduce the linear impact force transmitted to a player's head better than existing rugby headguards on the market?

(a) Impact Drop Test Results 1

Figure 29:
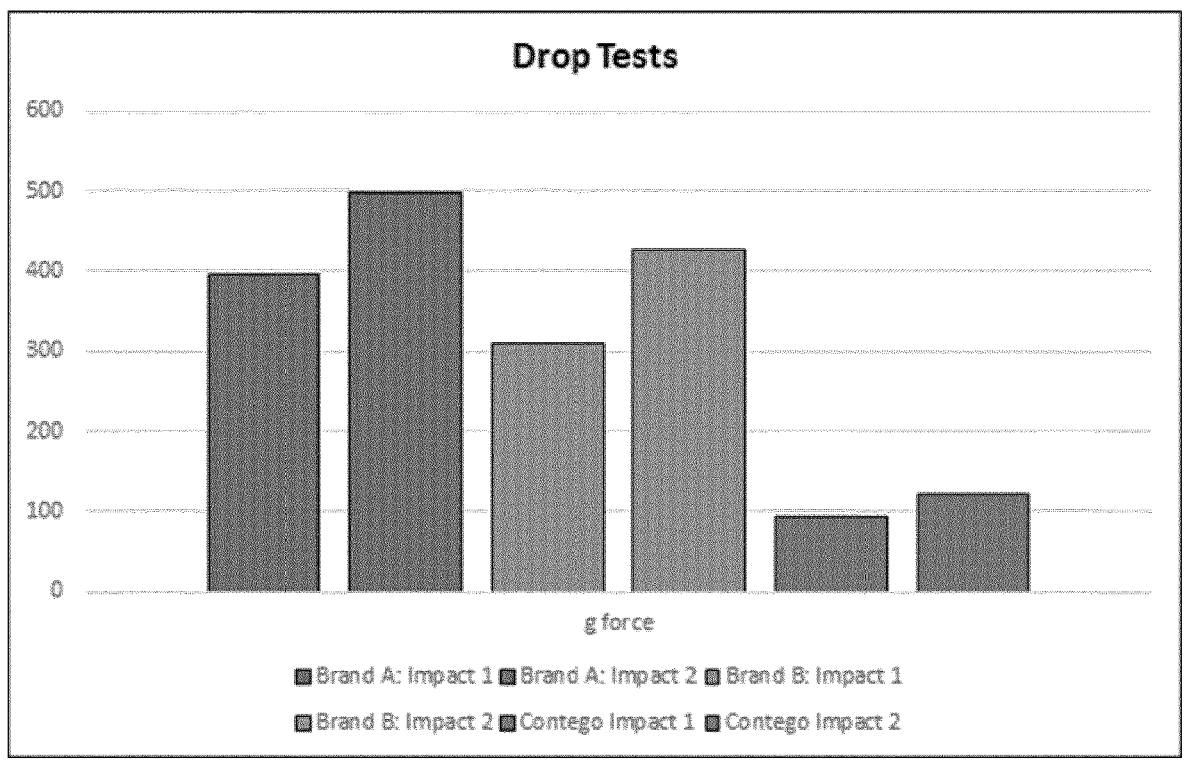
FIG. 29 is a bar chart of impact test results for drop testing.

The first results of the Impact Drop Tests were that the protective headgear of the invention reduced the linear impact forces transmitted to a player's head. See FIG. 29.

(b) Impact Drop Test Results 2

The second results of the Impact Tests were that the protective headgear of the invention reduced the linear impact force transmitted to a player's head better than existing rugby headguards on the market. See FIG. 29.

Rotational Acceleration Testing

Several rounds of rotational acceleration testing were carried out to validate the performance of the protective headgear of the invention in reducing rotational impact forces when 2 players were tackling each other. The objective of the rotational acceleration tests were:

1. Did the protective headgear of the invention reduce the rotational acceleration of the headform, in a collision/tackle, when compared to players that are not wearing any head protectors?

(a) Rotational Acceleration Test Results 1

The results of the Rotational Acceleration Tests were that the protective headgear of the invention reduced the rotational acceleration of the headform, in a collision/tackle when compared to players that were not wearing any head protectors. See FIG. 30.

i. When both head forms were protected with the protective headgear of the invention and tested at 2 m/sec the average Rotational Acceleration was reduced by 55% when compared to two unprotected head forms.

ii. When both head forms were protected with the protective headgear of the invention and tested at 3 m/sec the average Rotational Acceleration was reduced by 38% when compared to two unprotected head forms.

iii. When both head forms were protected with the protective headgear of the invention and tested at 4 m/sec the average Rotational Acceleration was reduced by 30% when compared to two unprotected head forms.

It will be appreciated that whilst the head protector of the invention reduces the incidence of concussion in rugby it also provides the basis for protective headgear across a range of other applications including other contact sports.

Referring to FIGS. 31 and 32 there is illustrated protective headgear of the invention which in this case is for use in playing soccer. The headgear comprises a main body 100 which wraps around the wearers head. The main body 100 has side head parts 102 and 103, which are connected by a forehead part 104. Each of the side parts 102, 103 also has a lace hole reinforcement part 105 at a side edge thereof, for connecting the side parts 102 and 103 to each other at the back of the head. This can be done with a lace, as described in previous embodiments, and secures the headgear to the head of the user. The construction of the various layers of the protective headgear of FIGS. 31 and 32 is the same as that described above for Rugby headgear.

Soccer is the most popular sport in the world, with more than 265 million players worldwide, including professional and amateur ones. There is growing evidence that heading a football can cause both short and long-term brain damage. Studies have shown that standard soccer heading results in immediate and measurable alterations in brain function. Changes in short and long term memory function and corticomotor inhibition are detectable immediately after soccer heading. [http://www.ebiomedicine.com/article/S2352-3964(16)30490-X/abstract]

The protective headgear of the invention provides a solution to this problem by providing protective headgear that will still allow the user to play soccer but which will reduce the impact from the football transferred to the head.

Figure 33:
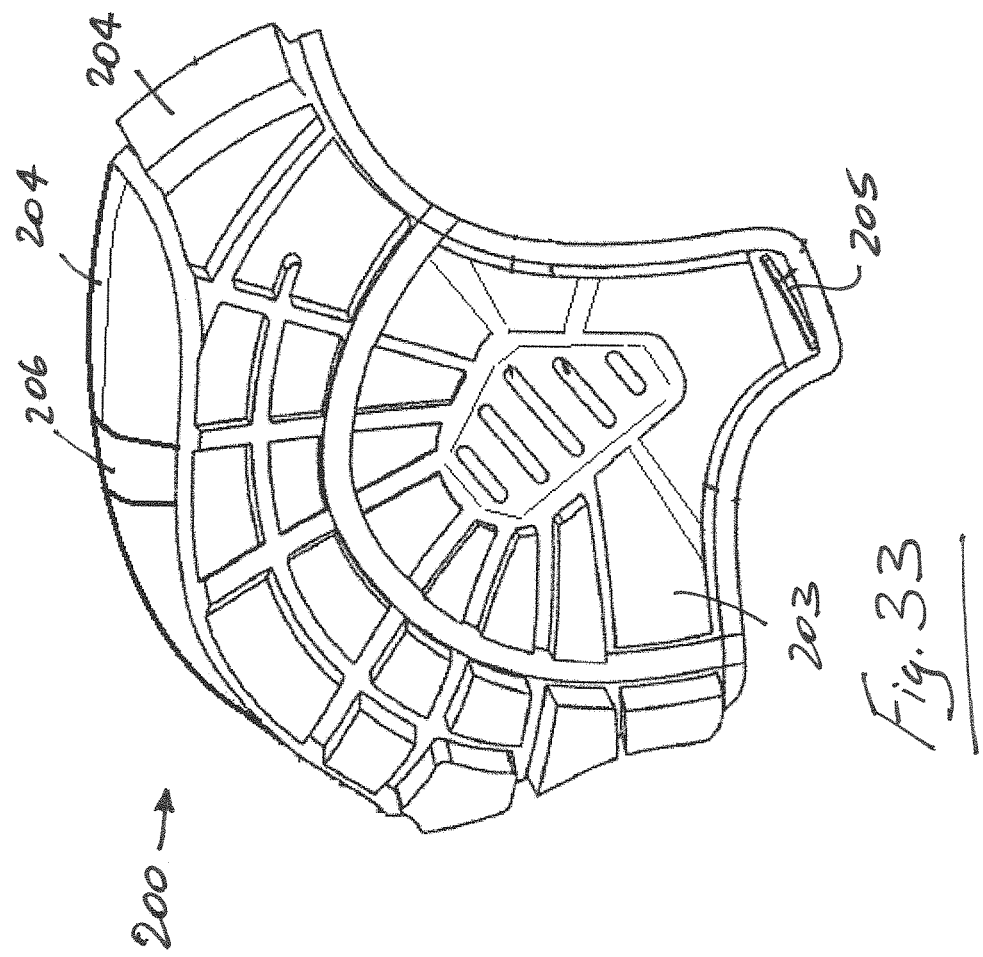
FIG. 33 is an elevational view of protective headgear such as boxing headgear according to the invention.
Figure 34:
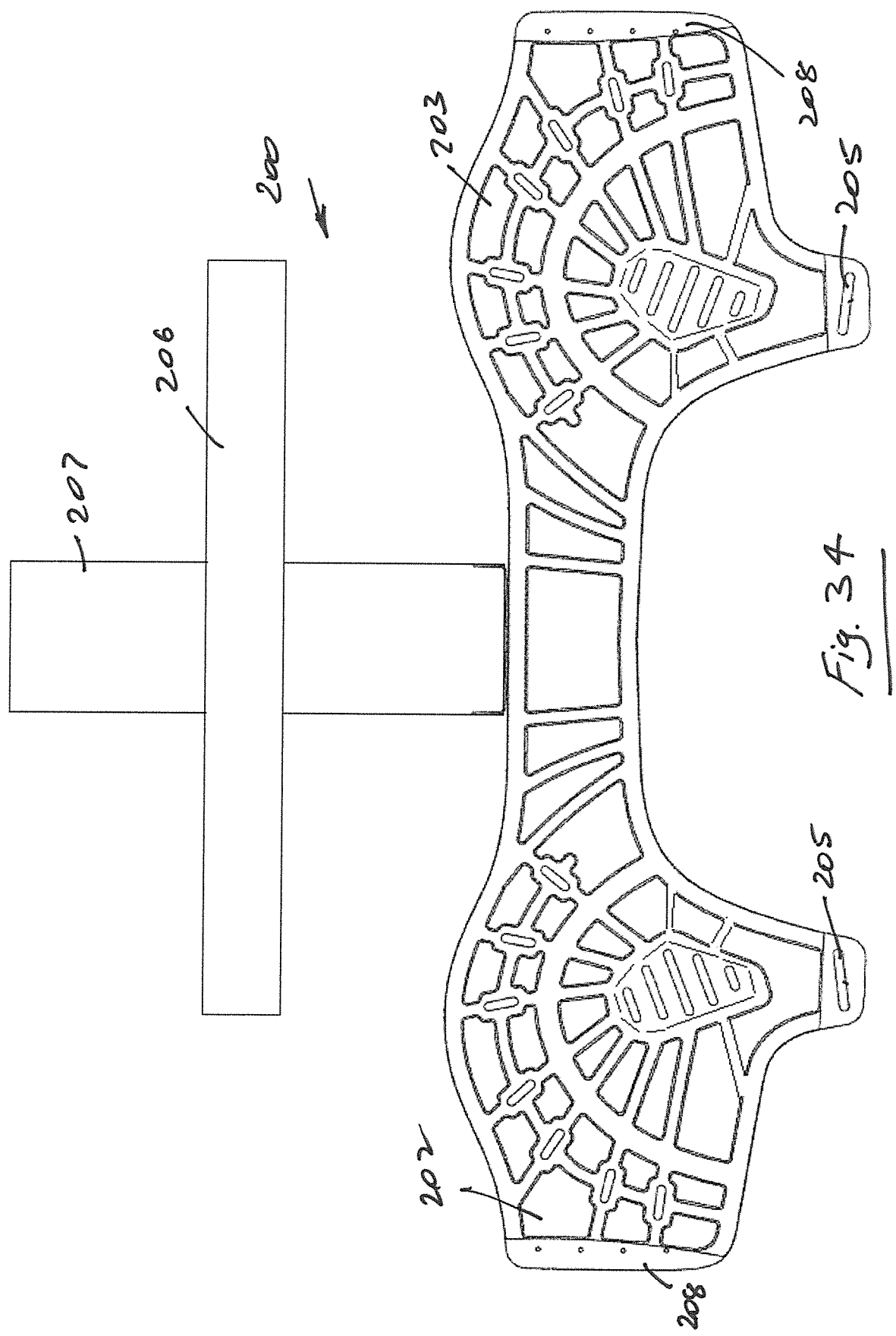
FIG. 34 is a plan view of protective headgear such as boxing headgear according to the invention.

Referring to FIGS. 33 and 34 there is illustrated the protective headgear of the invention which in this case is for use in boxing. The headgear comprises a main body 200 which encompasses the wearers head, but does not provide protection to the crown of the head as it is not required by the sport. The main body 200 has side head parts 202 and 203, which are connected by a forehead part 204. Side parts 202 and 203 are thicker than the remainder of the head gear in order to provide additional protection to the sides of the head which receive significant impacts. There is also a chin strap as in previous embodiments. Each side part 202, 203 also comprises a slot 205 for mounting a chin strap to the headgear. As in previous embodiments, the chinstrap is replaceable. Each of the side parts 202, 203 also has a lace hole reinforcement part 208 at a side edge thereof, for connecting the side parts 202 and 203 to each other at the back of the head. This can be done with a lace, as described in previous embodiments, and secures the headgear to the head of the user. Due to the nature of the sport, the headgear is further secured by a strap 206 connecting the sides 202 and 203 to each other and a further strap connecting the forehead part 204 to the back of the headgear. The construction of the various layers of the protective headgear of FIGS. 33 and 34 is the same as that described for Rugby headgear.

Chronic traumatic encephalopathy (CTE) is a neurodegenerative disease, which is associated with mild repetitive traumatic brain injury (TBI). This long-term and progressive symptom due to TBI was initially called punch-drunk syndrome or dementia pugilistica, since it was believed to be associated with boxing. However, serial neuropathological studies of mild repetitive TBI in the last decade have revealed that CTE occurs not only in boxers but also in a wider population including American football players, wrestlers, and military personnel. [https://www.ncbi.nlm.nih.gov/pubmed/27395469].

Conventional protective headgear in boxing has the problems that it does not reduce the rates of TBI in boxers and it can obscure peripheral vision, making it harder to see when a blow is being aimed at the side of the head.

The protective headgear of the invention provides a solution to these problems by reducing the impact from a punch transferred to the head. It also offers better peripheral vision for the wearer than conventional protective headgear in boxing.

Figure 35:
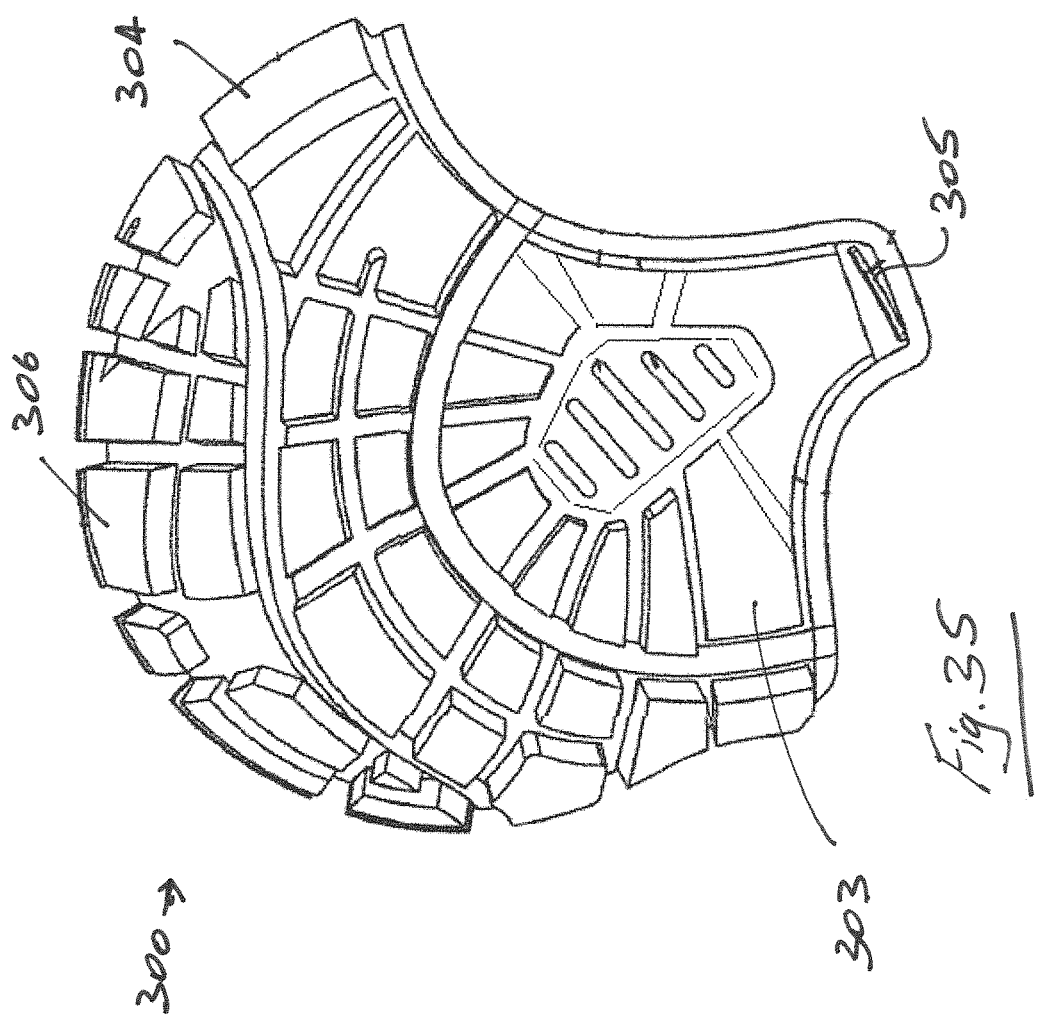
FIG. 35 is an elevational view of protective headgear such as mixed martial arts headgear according to the invention.
Figure 36:
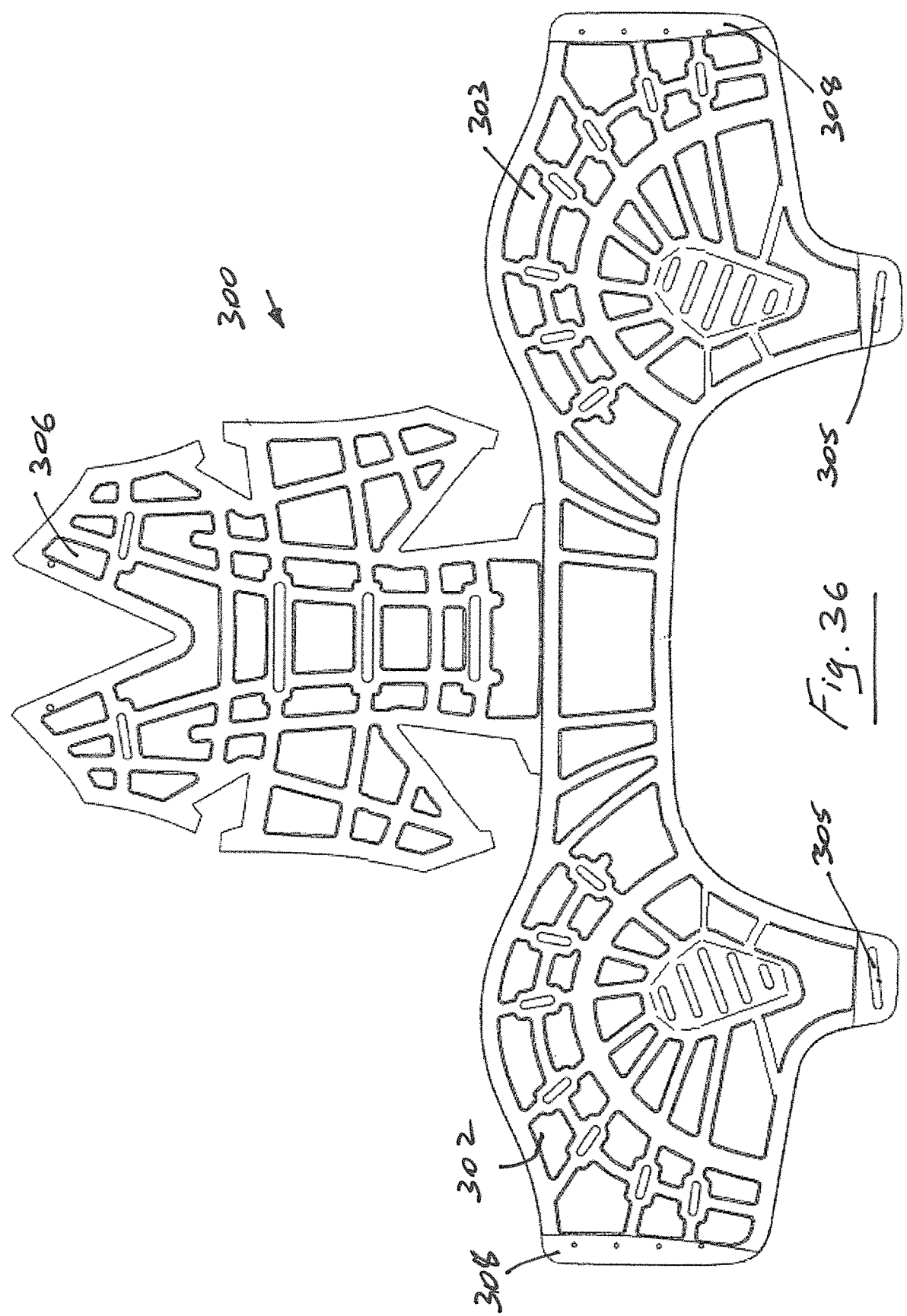
FIG. 36 is a plan view of protective headgear such as mixed martial arts headgear according to the invention.

Referring to FIGS. 35 and 36 there is illustrated protective headgear of the invention which in this case is used in mixed martial arts (MMA). The headgear comprises a main body 300 which encompasses a wearer's head. The main body 300 has side head parts 302, 303 connected by a forehead part 304 and a crown part 306 extending from the forehead part 304. Similarly to when used for boxing, the side parts 302 and 303 are thicker than the remainder of the head gear in order to provide additional protection to the sides of the head which receive significant impacts. Each of the side parts 302, 303 also has a lace hole reinforcement part 308 at a side edge thereof, for connecting the side parts 302 and 303 to each other at the back of the head. The construction of the various layers of the protective headgear of FIGS. 35 and 36 is the same as that described for Rugby headgear.

Mixed martial arts (MMA) is a full combative sport with a recent global increase in popularity despite significant scrutiny from medical associations. Studies have shown that rates of knockouts (KOs) and technical knockouts (TKOs) in MMA, due to match-ending head trauma, are higher than previously reported rates in other combative and contact sports. [https://www.ncbi.nlm.nih.gov/pubmed/24658345]

The protective headgear of the invention provides a solution to these problems by reducing the impact from a punch or kick transferred to the head. It also offers better peripheral vision for the wearer than conventional protective headgear in MMA.

The invention is not limited to the embodiments hereinbefore described, which may be varied in construction and detail.

The invention claimed is:

1. A protective headgear comprising a main body comprising:
   a pair of side head parts connected by a forehead part and a crown part extending from the forehead part, the main body being configured to encompass the head of a wearer;
   an inner layer of wicking material;
   an outer barrier layer; and
   an intermediate section between said inner layer of wicking material and said outer barrier layer, the intermediate section comprising:
      an inner foam layer; and
      an outer foam layer comprising a plurality of spaced-apart foam pieces,
   wherein said inner foam layer and said outer foam layer of the intermediate section comprise an impact resistant open cell polyurethane foam having a density of from 100 to 300 kg/m$^3$, and
   wherein the outer barrier layer comprises a plurality of pockets which are configured to receive the foam pieces of said intermediate section outer foam layer.

2. The protective headgear as claimed in claim 1 wherein the intermediate section comprises an impact resistant open cell polyurethane foam having a density of from 150 to 250 kg/m$^3$.

3. The protective headgear as claimed in claim 1 wherein the intermediate section inner foam layer is of an impact resistant open cell polyurethane foam having a density of from 150 to 250 kg/m$^3$.

4. The protective headgear as claimed in claim 1 wherein the intermediate section inner foam layer has a first thickness and the intermediate section outer foam layer has a second thickness which is greater than the first thickness.

5. The protective headgear as claimed in claim 4 wherein the second thickness is from 1.5 to 5 times the first thickness.

6. The protective headgear as claimed in claim 4, wherein the second thickness is from 1.5 to 3 times the first thickness.

7. The protective headgear as claimed in claim 4, wherein the second thickness is about 2 times the first thickness.

8. The protective headgear as claimed in claim 4, wherein the intermediate section inner foam layer is about 3 mm in thickness and the intermediate section outer foam layer foam pieces are about 6 mm in thickness.

9. The protective headgear as claimed in claim 1 wherein the intermediate section inner foam layer is perforated.

10. The protective headgear as claimed in claim 9 wherein the intermediate section inner foam layer comprises from 3 to 5 holes per cm$^2$ and the holes are from 2 mm to 4 mm in diameter.

11. The protective headgear as claimed in claim 1 wherein the intermediate section inner foam layer comprises a wicking fabric bonded to the inner layer of open cell foam.

12. The protective headgear as claimed in claim 1 wherein the outer barrier layer comprises closed cell foam.

13. The protective headgear as claimed in claim 1 wherein G-Force energy transferred to a wearer's head during impact is less than 150.

14. The protective headgear as claimed in claim 13, wherein G-Force energy transferred to the wearer's head during impact is less than 120.

15. The protective headgear as claimed in claim 1, further comprising an outer fabric bonded to the outer barrier layer.

16. The protective headgear as claimed in claim 1, wherein each side part of the main body comprises a plurality of through holes for alignment with a wearer's ears.

17. The protective headgear as claimed in claim 1, wherein each side part of the main body comprises a mounting for a chin strap.

* * * * *